US012790436B2

(12) United States Patent
Stafford et al.

(10) Patent No.: US 12,790,436 B2
(45) Date of Patent: Nov. 10, 2026

(54) MOLDED ARTICLES FOR USE WITH TERPENE CONTAINING OILS

(71) Applicant: Eastman Chemical Company, Kingsport, TN (US)

(72) Inventors: Steven Lee Stafford, Gray, TN (US); Bryan Steven Bishop, Gate City, VA (US); Kathleen Jean White, Kingsport, TN (US); Mason Scott Myers, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 252 days.

(21) Appl. No.: 18/251,549

(22) PCT Filed: Nov. 9, 2021

(86) PCT No.: PCT/US2021/058519
§ 371 (c)(1),
(2) Date: May 3, 2023

(87) PCT Pub. No.: WO2022/108783
PCT Pub. Date: May 27, 2022

(65) Prior Publication Data
US 2023/0407002 A1 Dec. 21, 2023

Related U.S. Application Data

(60) Provisional application No. 63/114,767, filed on Nov. 17, 2020.

(51) Int. Cl.
*C08G 63/199* (2006.01)

(52) U.S. Cl.
CPC ....... *C08G 63/199* (2013.01); *C08G 2250/00* (2013.01); *C08G 2390/00* (2013.01)

(58) Field of Classification Search
None
See application file for complete search history.

(56) References Cited

U.S. PATENT DOCUMENTS 1,602,699 A 10/1926 Nightingale
2,160,841 A 6/1939 Dreyfus
2,202,046 A 5/1940 Dreyfus et al.
2,278,537 A 4/1942 Dreyfus et al.
2,720,507 A 10/1955 Caldwell
2,806,064 A 9/1957 McKlveen
2,901,466 A 8/1959 Kibler
2,936,324 A 5/1960 Hasek et al.
3,030,335 A 4/1962 Hasek et al.
3,062,852 A 11/1962 Martin et al.
3,075,952 A 1/1963 Coover et al.
3,091,600 A 5/1963 Caldwell et al.
3,169,121 A 2/1965 Goldberg et al.
3,190,928 A 6/1965 Elam et al.
3,201,474 A 8/1965 Hasek et al.
3,207,814 A 9/1965 Goldberg et al.
3,218,372 A 11/1965 Okamura et al.
3,227,764 A 1/1966 Martin et al.
3,236,899 A 2/1966 Clark
3,249,652 A 5/1966 Quisenberry
3,259,469 A 7/1966 Painter et al.
3,287,390 A 11/1966 Poos et al.
3,288,854 A 11/1966 Martin
3,312,741 A 4/1967 Martin
3,313,777 A 4/1967 Elam et al.
3,317,466 A 5/1967 Caldwell et al.
3,329,722 A 7/1967 Rylander
3,360,547 A 12/1967 Wilson et al.
3,366,689 A 1/1968 Maeda et al.
3,386,935 A 6/1968 Jackson et al.
3,403,181 A 9/1968 Painter et al.
T858,012 I4 1/1969 Caldwell et al.
3,484,339 A 12/1969 Caldwell
3,502,620 A 3/1970 Caldwell
T873,016 I4 4/1970 Gilkey et al.
3,541,059 A 11/1970 Schaper
3,546,177 A 12/1970 Kibler et al.
3,629,202 A 12/1971 Gilkey et al.
RE27,682 E 6/1973 Hermann et al.
3,772,405 A 11/1973 Hamb
3,799,953 A 3/1974 Freitag et al.
3,845,884 A 11/1974 Hall et al.
3,915,913 A 10/1975 Jackson, Jr. et al.
(Continued)

FOREIGN PATENT DOCUMENTS

BE 615850 4/1962
CA 2035149 8/1991
(Continued)

OTHER PUBLICATIONS

Polyester (PES)(C7H2 Br3O3) Plastic Recycling (Retrieved from: <https://www.azom.com/article.aspx?ArticleID=7978> or Jun. 25, 2025, Dec. 2012). (Year: 2012).*
Saint Clair (Genius in a Bottle: The Best of Perfume Bottle Design by the Decade, Retrieved from: < https://www.beautylish.com/a/vxymq/perfume-bottle-design-history> on Jun. 25, 2025, May 2013) (Year: 2013).*
Guzman, D. (What are the Differences Between Perfume and Parfum? Retrieved from: <https://www.edensgarden.com/blogs/news/what-are-the-differences-between-perfume-and-parfum?srsltid=AfmBOopgpKcyxWrq3v0OKat7JVo-j6cPF8B9uqS-mcBsgpnauiPU8cyl> on: Jun. 25, 2025, Jun. 2019) (Year: 2019).*
Ragrances, vitamins and hormones—the ABC of terpenes, (Beauty Forum 2010 (3), 56-58), (Year: 2010).*
The Business of Perfume: Demographics, Gender, and Influence (Retrieved from: <https://takeonethingoff.com/blog/2018/05/23/the-business-of-perfume-demographics-gender-and-influence/#_ftn10> on: Jun. 25, 2025, May 2018), (Year: 2018).*
(Continued)

*Primary Examiner* — Robert S Jones, Jr.
*Assistant Examiner* — Lily K Sloan
(74) *Attorney, Agent, or Firm* — Robert C. Morriss

(57) ABSTRACT

A shaped article comprising a molded component configured to receive a terpene containing oil composition, said molded component formed of a copolyester composition having high chemical resistance to terpene oil and having a Tg of at least 95° C.

14 Claims, No Drawings

(56) References Cited

U.S. PATENT DOCUMENTS

| | | | |
|---|---|---|---|
| 3,962,189 | A | 6/1976 | Russin et al. |
| 4,001,184 | A | 1/1977 | Scott |
| 4,010,145 | A | 3/1977 | Russin et al. |
| 4,046,933 | A | 9/1977 | Stefanik |
| 4,056,504 | A | 11/1977 | Grundmeier et al. |
| 4,084,889 | A | 4/1978 | Vischer, Jr. |
| 4,125,572 | A | 11/1978 | Scott |
| 4,156,069 | A | 5/1979 | Prevorsek et al. |
| 4,160,383 | A | 7/1979 | Rauschenberger |
| 4,185,009 | A | 1/1980 | Idel et al. |
| 4,188,314 | A | 2/1980 | Fox et al. |
| 4,194,038 | A | 3/1980 | Baker et al. |
| 4,263,364 | A | 4/1981 | Seymour et al. |
| 4,264,751 | A | 4/1981 | Scheibelhoffer |
| 4,356,299 | A | 10/1982 | Cholod et al. |
| 4,367,186 | A | 1/1983 | Adelmann et al. |
| 4,372,455 | A | 2/1983 | Cochran |
| 4,384,106 | A | 5/1983 | Go et al. |
| 4,391,954 | A | 7/1983 | Scott |
| 4,424,140 | A | 1/1984 | Weinberg et al. |
| 4,426,512 | A | 1/1984 | Barbee et al. |
| 4,427,614 | A | 1/1984 | Barham et al. |
| 4,430,484 | A | 2/1984 | Quinn |
| 4,431,793 | A | 2/1984 | Rosenquist |
| 4,452,933 | A | 6/1984 | McCready |
| 4,465,820 | A | 8/1984 | Miller et al. |
| 4,469,861 | A | 9/1984 | Mark et al. |
| 4,480,086 | A | 10/1984 | O'Neill |
| 4,525,504 | A | 6/1985 | Morriss et al. |
| 4,578,295 | A | 3/1986 | Jabarin |
| 4,578,437 | A | 3/1986 | Light et al. |
| 4,642,959 | A | 2/1987 | Swiech, Jr. et al. |
| 4,738,880 | A | 4/1988 | Asada et al. |
| 4,749,773 | A | 6/1988 | Weaver et al. |
| 4,786,692 | A | 11/1988 | Allen et al. |
| 4,816,308 | A | 3/1989 | Shimizu et al. |
| 4,826,903 | A | 5/1989 | Weaver et al. |
| 4,845,188 | A | 7/1989 | Martini et al. |
| 4,846,359 | A | 7/1989 | Weaver et al. |
| 4,882,412 | A | 11/1989 | Weaver et al. |
| 4,892,922 | A | 1/1990 | Weaver et al. |
| 4,892,923 | A | 1/1990 | Weaver et al. |
| 4,937,134 | A | 6/1990 | Schrenk et al. |
| 4,939,186 | A | 7/1990 | Nelson et al. |
| 4,976,057 | A | 12/1990 | Bianchi |
| 4,981,898 | A | 1/1991 | Bassett |
| 4,985,342 | A | 1/1991 | Muramoto et al. |
| 5,017,679 | A | 5/1991 | Chang et al. |
| 5,017,680 | A | 5/1991 | Sublett |
| 5,034,252 | A | 7/1991 | Nilsson et al. |
| 5,104,450 | A | 4/1992 | Sand et al. |
| 5,118,760 | A | 6/1992 | Blakely et al. |
| 5,118,847 | A | 6/1992 | Jackson et al. |
| 5,142,088 | A | 8/1992 | Phelps et al. |
| 5,169,994 | A | 12/1992 | Sumner, Jr. et al. |
| 5,183,863 | A | 2/1993 | Nakamura et al. |
| 5,191,038 | A | 3/1993 | Krabbenhoft et al. |
| 5,207,967 | A | 5/1993 | Small et al. |
| 5,217,128 | A | 6/1993 | Stenger |
| 5,224,958 | A | 7/1993 | Warunek et al. |
| 5,239,020 | A | 8/1993 | Morris |
| 5,256,761 | A | 10/1993 | Blount, Jr. |
| 5,258,556 | A | 11/1993 | Sumner, Jr. et al. |
| 5,268,219 | A | 12/1993 | Harada et al. |
| 5,283,295 | A | 2/1994 | Light et al. |
| 5,288,715 | A | 2/1994 | Machell et al. |
| 5,288,764 | A | 2/1994 | Rotter et al. |
| 5,292,783 | A | 3/1994 | Buchanan et al. |
| 5,310,611 | A | 5/1994 | Okabe et al. |
| 5,310,787 | A | 5/1994 | Kutsuwa et al. |
| 5,326,584 | A | 7/1994 | Kamel et al. |
| 5,331,034 | A | 7/1994 | Pfahler et al. |
| 5,333,073 | A | 7/1994 | Suzuki |
| 5,354,791 | A | 10/1994 | Gallucci |
| 5,372,864 | A | 12/1994 | Weaver et al. |
| 5,372,879 | A | 12/1994 | Handa et al. |
| 5,378,796 | A | 1/1995 | George et al. |
| 5,382,292 | A | 1/1995 | Conroy et al. |
| 5,384,377 | A | 1/1995 | Weaver et al. |
| 5,474,735 | A | 12/1995 | Krishnakumar et al. |
| 5,475,144 | A | 12/1995 | Watson et al. |
| 5,480,926 | A | 1/1996 | Fagerburg et al. |
| 5,486,562 | A | 1/1996 | Borman et al. |
| 5,489,665 | A | 2/1996 | Yamato et al. |
| 5,494,992 | A | 2/1996 | Kanno et al. |
| 5,498,668 | A | 3/1996 | Scott |
| 5,498,688 | A | 3/1996 | Oshino et al. |
| 5,506,014 | A | 4/1996 | Minnick |
| 5,523,382 | A | 6/1996 | Beavers et al. |
| 5,534,609 | A | 7/1996 | Lewis et al. |
| 5,552,512 | A | 9/1996 | Sublett |
| 5,591,530 | A | 1/1997 | Warner et al. |
| 5,633,340 | A | 5/1997 | Hoffman et al. |
| 5,650,453 | A | 7/1997 | Eckberg et al. |
| 5,654,347 | A | 8/1997 | Khemani et al. |
| 5,656,715 | A | 8/1997 | Dickerson et al. |
| 5,668,243 | A | 9/1997 | Yau et al. |
| 5,681,918 | A | 10/1997 | Adams et al. |
| 5,688,874 | A | 11/1997 | Hoffman |
| 5,696,176 | A | 12/1997 | Khemani et al. |
| 5,705,575 | A | 1/1998 | Kelsey |
| 5,780,130 | A | 7/1998 | Hansen et al. |
| 5,783,307 | A | 7/1998 | Fagerburg et al. |
| 5,800,897 | A | 9/1998 | Sharma et al. |
| 5,804,617 | A | 9/1998 | Hoffman et al. |
| 5,814,679 | A | 9/1998 | Eckberg et al. |
| 5,859,116 | A | 1/1999 | Shih |
| 5,863,622 | A | 1/1999 | Jester |
| 5,902,631 | A | 5/1999 | Wang et al. |
| 5,907,026 | A | 5/1999 | Factor et al. |
| 5,912,307 | A | 6/1999 | Paschke et al. |
| 5,918,754 | A | 7/1999 | Lyons et al. |
| 5,942,585 | A | 8/1999 | Scott et al. |
| 5,954,216 | A | 9/1999 | Meisner et al. |
| 5,958,539 | A | 9/1999 | Eckart et al. |
| 5,958,581 | A | 9/1999 | Khanarian et al. |
| 5,959,066 | A | 9/1999 | Charbonneau et al. |
| 5,962,625 | A | 10/1999 | Yau |
| 5,977,347 | A | 11/1999 | Shuto et al. |
| 5,989,663 | A | 11/1999 | Morris et al. |
| 6,001,910 | A | 12/1999 | Blumenthal et al. |
| 6,005,059 | A | 12/1999 | Scott et al. |
| 6,011,124 | A | 1/2000 | Scott et al. |
| 6,012,597 | A | 1/2000 | Nishihara et al. |
| 6,022,603 | A | 2/2000 | Umeda et al. |
| 6,025,061 | A | 2/2000 | Khanarian et al. |
| 6,030,671 | A | 2/2000 | Yang et al. |
| 6,037,424 | A | 3/2000 | Scott et al. |
| 6,043,322 | A | 3/2000 | Scott et al. |
| 6,044,996 | A | 4/2000 | Carew et al. |
| 6,063,464 | A | 5/2000 | Charbonneau et al. |
| 6,063,465 | A | 5/2000 | Charbonneau et al. |
| 6,063,495 | A | 5/2000 | Charbonneau et al. |
| 6,084,019 | A | 7/2000 | Matayabas et al. |
| 6,096,854 | A | 8/2000 | Morris et al. |
| 6,114,575 | A | 9/2000 | McMahon et al. |
| 6,120,477 | A | 9/2000 | Campbell et al. |
| 6,120,889 | A | 9/2000 | Turner et al. |
| 6,126,992 | A | 10/2000 | Khanarian et al. |
| 6,127,492 | A | 10/2000 | Nagashima et al. |
| 6,146,228 | A | 11/2000 | Mougin et al. |
| 6,150,494 | A | 11/2000 | Wang et al. |
| 6,183,848 | B1 | 2/2001 | Turner et al. |
| 6,191,209 | B1 | 2/2001 | Andrews et al. |
| 6,211,309 | B1 | 4/2001 | McIntosh et al. |
| 6,221,556 | B1 | 4/2001 | Gallucci et al. |
| 6,225,436 | B1 | 5/2001 | Eiffler et al. |
| 6,232,504 | B1 | 5/2001 | Barteau et al. |
| 6,239,910 | B1 | 5/2001 | Kim et al. |
| 6,255,523 | B1 | 7/2001 | Panandiker et al. |
| 6,273,282 | B1 | 8/2001 | Ogg et al. |
| 6,287,656 | B1 | 9/2001 | Turner et al. |
| 6,307,006 | B1 | 10/2001 | Konig et al. |
| 6,309,718 | B1 | 10/2001 | Sprayberry |

(56) References Cited

U.S. PATENT DOCUMENTS 6,320,042 B1 11/2001 Michihata et al.
6,323,291 B1 11/2001 Mason et al.
6,323,304 B1 11/2001 Lemmon et al.
6,342,304 B1 1/2002 Buchanan et al.
6,352,783 B1 3/2002 Fagerburg
6,354,986 B1 3/2002 Hlavinka et al.
6,359,070 B1 3/2002 Khanarian et al.
6,406,792 B1 6/2002 Briquet et al.
6,431,401 B1 8/2002 Giblin et al.
6,448,334 B1 9/2002 Verhoogt et al.
6,458,468 B1 10/2002 Moskala et al.
6,504,002 B1 1/2003 Karlik et al.
6,559,272 B1 5/2003 Jeon et al.
6,573,328 B2 6/2003 Kropp et al.
6,576,717 B1 6/2003 Kuo et al.
6,599,994 B2 7/2003 Shelby et al.
6,639,067 B1 10/2003 Brinegar et al.
6,656,577 B1 12/2003 Adelman et al.
6,669,980 B2 12/2003 Hansen
6,723,768 B2 4/2004 Adams et al.
6,733,716 B2 5/2004 Belcher
6,740,377 B2 5/2004 Pecorini et al.
6,740,714 B2 5/2004 Pecorini et al.
6,818,293 B1 11/2004 Keep et al.
6,818,730 B2 11/2004 Brandenburg et al.
6,846,440 B2 1/2005 Flynn et al.
6,846,508 B1 1/2005 Colas et al.
6,896,966 B2 5/2005 Crawford et al.
6,908,650 B2 6/2005 Odorisio et al.
6,914,120 B2 7/2005 Germroth et al.
7,037,576 B2 5/2006 Willham et al.
7,048,978 B2 5/2006 Tanaka et al.
7,051,892 B1 5/2006 Tanaka et al.
7,122,661 B2 10/2006 Fleche et al.
7,169,880 B2 1/2007 Shelby et al.
7,273,894 B2 9/2007 Shelby et al.
7,297,755 B2 11/2007 Shelby et al.
7,354,628 B2 4/2008 Steube
7,375,154 B2 5/2008 Stafford et al.
7,427,430 B2 9/2008 Rhee et al.
7,462,684 B2 12/2008 Hale et al.
7,468,409 B2 12/2008 Pearson et al.
7,482,397 B2 1/2009 Pearson et al.
7,510,768 B2 3/2009 Crawford et al.
7,576,171 B2 8/2009 Crawford et al.
7,704,605 B2 4/2010 Crawford et al.
7,737,246 B2 6/2010 Crawford et al.
7,740,941 B2 6/2010 Crawford et al.
7,781,562 B2 8/2010 Crawford et al.
7,803,439 B2 9/2010 Crawford et al.
7,803,440 B2 9/2010 Crawford et al.
7,803,441 B2 9/2010 Crawford et al.
7,807,774 B2 10/2010 Crawford et al.
7,807,775 B2 10/2010 Crawford et al.
7,812,111 B2 10/2010 Crawford et al.
7,812,112 B2 10/2010 Crawford et al.
7,834,129 B2 11/2010 Crawford et al.
7,838,620 B2 11/2010 Crawford et al.
7,842,776 B2 11/2010 Crawford et al.
7,855,267 B2 12/2010 Crawford et al.
7,868,128 B2 1/2011 Crawford et al.
7,893,187 B2 2/2011 Crawford et al.
7,893,188 B2 2/2011 Crawford et al.
7,902,320 B2 3/2011 Crawford et al.
7,906,211 B2 3/2011 Crawford et al.
7,906,212 B2 3/2011 Crawford et al.
7,906,610 B2 3/2011 Crawford et al.
7,915,376 B2 3/2011 Crawford et al.
7,951,900 B2 5/2011 Crawford et al.
7,955,674 B2 6/2011 Hale et al.
7,959,836 B2 6/2011 Hale et al.
7,959,998 B2 6/2011 Hale et al.
7,985,827 B2 7/2011 Crawford et al.
8,063,172 B2 11/2011 Crawford et al.
8,063,173 B2 11/2011 Crawford et al.
8,067,525 B2 11/2011 Crawford et al.
8,101,705 B2 1/2012 Crawford et al.
8,119,761 B2 2/2012 Crawford et al.
8,119,762 B2 2/2012 Crawford et al.
8,133,967 B2 3/2012 Pecorini et al.
8,193,302 B2 6/2012 Crawford et al.
8,198,371 B2 6/2012 Stack et al.
8,287,970 B2 10/2012 Pecorini et al.
8,299,204 B2 10/2012 Germroth et al.
8,354,491 B2 1/2013 Crawford et al.
8,415,450 B2 4/2013 Crawford et al.
8,501,287 B2 8/2013 Pecorini et al.
8,501,292 B2 8/2013 Pecorini
8,507,638 B2 8/2013 Crawford et al.
9,067,197 B2 6/2015 Doering
9,169,348 B2 10/2015 Crawford et al.
9,169,388 B2 10/2015 Germroth et al.
9,175,134 B2 11/2015 Crawford et al.
9,181,387 B2 11/2015 Crawford et al.
9,181,388 B2 11/2015 Crawford et al.
9,534,079 B2 1/2017 Crawford et al.
9,598,533 B2 3/2017 Crawford et al.
9,982,125 B2 5/2018 Crawford et al.
2001/0029324 A1 10/2001 Walker et al.
2001/0031805 A1 10/2001 Buhler
2001/0034419 A1 10/2001 Kanayama et al.
2001/0044003 A1 11/2001 Galluci et al.
2002/0055586 A1 5/2002 Dalgewicz, III et al.
2002/0128357 A1 9/2002 Goossens et al.
2002/0132963 A1 9/2002 Quillen
2002/0137856 A1 9/2002 Andrews et al.
2002/0188092 A1 12/2002 Moskala et al.
2002/0198297 A1 12/2002 Odorisio et al.
2003/0032737 A1 2/2003 Andrews et al.
2003/0060546 A1 3/2003 Moskala et al.
2003/0075516 A1 4/2003 Rothman et al.
2003/0077546 A1 4/2003 Donovan et al.
2003/0135015 A1 7/2003 Fujimaki et al.
2003/0139497 A1 7/2003 Odorisio et al.
2003/0149177 A1 8/2003 Andrews et al.
2003/0169514 A1 9/2003 Bourdelais et al.
2003/0187151 A1 10/2003 Adams et al.
2003/0195295 A1 10/2003 Mahood et al.
2003/0221716 A1 12/2003 Olson
2003/0229181 A1 12/2003 Hariharan et al.
2004/0022526 A1 2/2004 Kuno et al.
2004/0056053 A1 3/2004 Hollander et al.
2004/0063864 A1 4/2004 Adams et al.
2004/0101687 A1 5/2004 Crawford et al.
2004/0106707 A1 6/2004 Su et al.
2004/0106767 A1 6/2004 Simon et al.
2004/0108623 A1 6/2004 Deeter et al.
2004/0138381 A1 7/2004 Blasius et al.
2004/0145700 A1 7/2004 Miniutti et al.
2004/0164279 A1 8/2004 Stevenson et al.
2004/0202822 A1 10/2004 Bourdelais et al.
2004/0214984 A1 10/2004 Keep et al.
2005/0008885 A1 1/2005 Blakely et al.
2005/0072060 A1 4/2005 Moncho et al.
2005/0096453 A1 5/2005 Flynn et al.
2005/0101759 A1 5/2005 Odorisio et al.
2005/0113556 A1 5/2005 Strand et al.
2005/0119359 A1 6/2005 Shelby et al.
2005/0124779 A1 6/2005 Shelby et al.
2005/0181155 A1 8/2005 Share et al.
2006/0004151 A1 1/2006 Shaikh et al.
2006/0036012 A1 2/2006 Hayes et al.
2006/0094858 A1 5/2006 Turner et al.
2006/0111481 A1 5/2006 Pearson et al.
2006/0111519 A1 5/2006 Strand et al.
2006/0135668 A1 6/2006 Hayes
2006/0146228 A1 7/2006 Sogo et al.
2006/0151907 A1 7/2006 Kashiwabara
2006/0180560 A1 8/2006 Robinson
2006/0197246 A1 9/2006 Hale et al.
2006/0199904 A1 9/2006 Hale et al.
2006/0199919 A1 9/2006 Hale et al.
2006/0199921 A1 9/2006 Hale et al.
2006/0226565 A1 10/2006 Hale et al.

(56) References Cited

U.S. PATENT DOCUMENTS

| | | | | |
|---|---|---|---|---|
| 2006/0228507 | A1 | 10/2006 | Hale et al. | |
| 2006/0234073 | A1 | 10/2006 | Hale et al. | |
| 2006/0235167 | A1 | 10/2006 | Hale et al. | |
| 2006/0247388 | A1 | 11/2006 | Hale et al. | |
| 2006/0270773 | A1 | 11/2006 | Hale et al. | |
| 2006/0270806 | A1 | 11/2006 | Hale | |
| 2006/0286322 | A1 | 12/2006 | Crawford et al. | |
| 2006/0286326 | A1 | 12/2006 | Crawford et al. | |
| 2006/0286327 | A1 | 12/2006 | Crawford et al. | |
| 2006/0286328 | A1 | 12/2006 | Crawford et al. | |
| 2006/0286329 | A1 | 12/2006 | Crawford et al. | |
| 2006/0286330 | A1 | 12/2006 | Crawford et al. | |
| 2006/0286331 | A1 | 12/2006 | Crawford et al. | |
| 2006/0286384 | A1 | 12/2006 | Crawford et al. | |
| 2006/0286389 | A1 | 12/2006 | Crawford et al. | |
| 2006/0286394 | A1 | 12/2006 | Crawford et al. | |
| 2006/0287474 | A1 | 12/2006 | Crawford et al. | |
| 2006/0287476 | A1 | 12/2006 | Crawford et al. | |
| 2006/0287477 | A1 | 12/2006 | Crawford et al. | |
| 2006/0287478 | A1 | 12/2006 | Crawford | |
| 2006/0287479 | A1 | 12/2006 | Crawford et al. | |
| 2006/0287480 | A1 | 12/2006 | Crawford et al. | |
| 2006/0287481 | A1 | 12/2006 | Crawford | |
| 2006/0287483 | A1 | 12/2006 | Crawford et al. | |
| 2006/0287484 | A1 | 12/2006 | Crawford et al. | |
| 2006/0287485 | A1 | 12/2006 | Crawford et al. | |
| 2006/0287486 | A1 | 12/2006 | Crawford et al. | |
| 2006/0287487 | A1 | 12/2006 | Crawford et al. | |
| 2006/0287488 | A1 | 12/2006 | Crawford et al. | |
| 2006/0287489 | A1 | 12/2006 | Crawford et al. | |
| 2006/0287490 | A1 | 12/2006 | Crawford et al. | |
| 2006/0287491 | A1 | 12/2006 | Crawford et al. | |
| 2006/0287492 | A1 | 12/2006 | Crawford et al. | |
| 2006/0287493 | A1 | 12/2006 | Crawford et al. | |
| 2006/0287494 | A1 | 12/2006 | Crawford | |
| 2006/0287495 | A1 | 12/2006 | Crawford et al. | |
| 2006/0287496 | A1* | 12/2006 | Crawford ............. | A01G 9/1438 528/302 |
| 2006/0293494 | A1 | 12/2006 | Crawford et al. | |
| 2006/0293495 | A1 | 12/2006 | Crawford et al. | |
| 2007/0010649 | A1 | 1/2007 | Crawford et al. | |
| 2007/0016050 | A1 | 1/2007 | Crawford et al. | |
| 2007/0071930 | A1 | 3/2007 | Shelby et al. | |
| 2007/0100122 | A1 | 5/2007 | Crawford et al. | |
| 2007/0100125 | A1 | 5/2007 | Crawford et al. | |
| 2007/0105993 | A1 | 5/2007 | Germroth et al. | |
| 2007/0106054 | A1 | 5/2007 | Crawford et al. | |
| 2007/0129531 | A1 | 6/2007 | Crawford et al. | |
| 2007/0142511 | A1 | 6/2007 | Crawford et al. | |
| 2007/0142615 | A1 | 6/2007 | Crawford et al. | |
| 2007/0232778 | A1 | 10/2007 | Moody et al. | |
| 2007/0232779 | A1 | 10/2007 | Moody et al. | |
| 2007/0270569 | A1 | 11/2007 | Crawford et al. | |
| 2008/0092776 | A1 | 4/2008 | Stockl et al. | |
| 2008/0103235 | A1 | 5/2008 | Hale | |
| 2008/0293857 | A1 | 11/2008 | Crawford et al. | |
| 2008/0293882 | A1 | 11/2008 | Germroth et al. | |
| 2009/0093573 | A1 | 4/2009 | Germroth et al. | |
| 2009/0093574 | A1 | 4/2009 | Crawford et al. | |
| 2009/0130353 | A1 | 5/2009 | Pecorini et al. | |
| 2009/0137723 | A1 | 5/2009 | Crawford et al. | |
| 2009/0137735 | A1 | 5/2009 | Crawford et al. | |
| 2010/0087574 | A1 | 4/2010 | Crawford et al. | |
| 2010/0092705 | A1 | 4/2010 | Crawford et al. | |
| 2010/0096589 | A1 | 4/2010 | Crawford et al. | |
| 2010/0099828 | A1 | 4/2010 | Stack et al. | |
| 2010/0120979 | A1 | 5/2010 | Crawford et al. | |
| 2010/0159176 | A1 | 6/2010 | Hale et al. | |
| 2010/0174030 | A1 | 7/2010 | Crawford et al. | |
| 2010/0174033 | A1 | 7/2010 | Crawford et al. | |
| 2010/0174034 | A1 | 7/2010 | Crawford et al. | |
| 2010/0184940 | A1 | 7/2010 | Germroth et al. | |
| 2010/0204413 | A1 | 8/2010 | Powell et al. | |
| 2010/0227971 | A1 | 9/2010 | Crawford et al. | |
| 2010/0249293 | A1 | 9/2010 | Treece et al. | |
| 2010/0252570 | A1 | 10/2010 | Yui | |
| 2010/0298523 | A1 | 11/2010 | Germroth et al. | |
| 2010/0300918 | A1 | 12/2010 | Crawford et al. | |
| 2010/0301524 | A1 | 12/2010 | Crawford et al. | |
| 2011/0017751 | A1 | 1/2011 | Pecorini et al. | |
| 2011/0042338 | A1 | 2/2011 | Pecorini et al. | |
| 2011/0043364 | A1* | 2/2011 | Stefanelli ............... | A45D 34/00 340/572.8 |
| 2011/0054091 | A1 | 3/2011 | Crawford et al. | |
| 2011/0144266 | A1 | 6/2011 | Crawford et al. | |
| 2011/0189415 | A1 | 8/2011 | Crawford et al. | |
| 2011/0306730 | A1 | 12/2011 | Crawford et al. | |
| 2012/0021158 | A1 | 1/2012 | Crawford et al. | |
| 2012/0108715 | A1 | 5/2012 | Crawford et al. | |
| 2012/0184668 | A1 | 7/2012 | Stack et al. | |
| 2012/0184669 | A1 | 7/2012 | Hale et al. | |
| 2012/0184687 | A1 | 7/2012 | Hale et al. | |
| 2012/0318767 | A1 | 12/2012 | Burgess et al. | |
| 2012/0322951 | A1 | 12/2012 | Hale et al. | |
| 2012/0328815 | A1 | 12/2012 | Pecorini et al. | |
| 2013/0072628 | A1 | 3/2013 | Crawford et al. | |
| 2013/0217830 | A1 | 8/2013 | Crawford et al. | |
| 2014/0010982 | A1 | 1/2014 | Neill et al. | |
| 2016/0009857 | A1 | 1/2016 | Crawford et al. | |
| 2016/0009951 | A1 | 1/2016 | Crawford et al. | |
| 2016/0017125 | A1 | 1/2016 | Germroth et al. | |
| 2021/0246304 | A1 | 8/2021 | Hino | |

FOREIGN PATENT DOCUMENTS

| | | | |
|---|---|---|---|
| CN | 1902280 | A | 1/2007 |
| CN | 101193668 | A | 6/2008 |
| CN | 101193935 | B | 1/2013 |
| CN | 101868340 | B | 4/2016 |
| CN | 104610712 | B | 8/2016 |
| DE | 29 21 868 | A1 | 12/1980 |
| DE | 197 27 709 | | 6/1997 |
| DE | 198 11 773 | A1 | 9/1999 |
| EP | 0 039 838 | A1 | 11/1981 |
| EP | 0 273 144 | A2 | 5/1987 |
| EP | 0 282 277 | A2 | 9/1988 |
| EP | 0 372 846 | A2 | 6/1990 |
| EP | 0 544 008 | A1 | 6/1993 |
| EP | 0 544 413 | A1 | 5/1994 |
| EP | 0 698 631 | A2 | 6/1996 |
| EP | 0 714 764 | A2 | 6/1996 |
| EP | 0 902 052 | A1 | 3/1999 |
| EP | 0 930 531 | A1 | 7/1999 |
| EP | 1 035 167 | A1 | 9/2000 |
| EP | 1 066 825 | A1 | 1/2001 |
| EP | 2 332 592 | A1 | 6/2011 |
| EP | 2329856 | A1 | 6/2011 |
| EP | 2618984 | B1 | 9/2011 |
| EP | 2 168 752 | B1 | 1/2015 |
| EP | 3676310 | A1 | 7/2020 |
| FR | 1291273 | | 5/1965 |
| FR | 1432471 | | 2/1966 |
| FR | 1434658 | | 2/1966 |
| FR | 2112400 | | 6/1972 |
| GB | 962913 | A | 7/1964 |
| GB | 1041651 | | 9/1966 |
| GB | 1044015 | | 9/1966 |
| GB | 1047043 | | 11/1966 |
| GB | 1090241 | | 11/1967 |
| GB | 1130558 | | 10/1968 |
| GB | 1278284 | | 6/1972 |
| GB | 1364732 | A | 8/1974 |
| GB | 2216919 | A | 10/1989 |
| JP | 56-88440 | | 12/1979 |
| JP | 03207743 | | 9/1991 |
| JP | 65-01040 | | 2/1994 |
| JP | 9-59371 | | 4/1997 |
| JP | 11-222516 | | 8/1999 |
| JP | 2001-066701 | | 8/1999 |
| JP | 2000-352620 | | 12/2000 |
| JP | 2001-098086 | | 4/2001 |
| JP | 2001-214049 | | 8/2001 |
| JP | 2002-059913 | A | 2/2002 |
| JP | 2004-058565 | | 2/2004 |

(56) References Cited

FOREIGN PATENT DOCUMENTS

| | | | |
|---|---|---|---|
| JP | 2004-066624 | | 2/2004 |
| JP | 2004-244497 | | 3/2004 |
| JP | 2004-292558 | | 10/2004 |
| JP | 2005-254757 | | 9/2005 |
| JP | 2007-069914 | | 3/2007 |
| JP | 2007-253491 | | 10/2007 |
| JP | 6039564 | B2 | 12/2016 |
| KR | 2001-089942 | | 10/2001 |
| KR | 2003-054611 | | 7/2003 |
| WO | WO 93/06018 | A1 | 4/1993 |
| WO | WO 01-06981 | | 1/1997 |
| WO | WO 97/11106 | A1 | 3/1997 |
| WO | WO 01-85824 | | 2/2001 |
| WO | WO 02-055570 | | 11/2001 |
| WO | WO 02-59207 | | 7/2002 |
| WO | WO 2021/138389 | A1 | 7/2021 |
| WO | WO 2022/108783 | A1 | 5/2022 |
| WO | WO 2023/130372 | A1 | 7/2023 |

OTHER PUBLICATIONS

ASTMD256; "Standard Test Methods for Determining the Izod Pendulum Impact Resistance of Plastics"; Published Mar. 2023.

ASTMD638; "Standard Test Method for Tensile Properties of Plastics"; Published Jul. 2022.

ASTM D648—06, Standard Test Method for Deflection Temperature of Plastics Under Flexural Load in the Edgewise Position, Mar. 15, 2006.

ASTM D790—03, Standard Test Methods for Flexural Properties of Unreinforced and Reinforced Plastics and Electrical Insulating Materials, Mar. 10, 2003.

ASTMD1003; "Standard Test Method for Haze and Luminous Transmittance of Transparent Plastics"; Published Jun. 2021.

ASTME1348; "Standard Test Method for Transmittance and Color by Spectrophotometry Using Hemispherical Geometry"; Published Nov. 2022.

ASTM D1525—06, Standard Test Method for Vicat Softening Temperature of Plastics, Mar. 15, 2006.

ASTMD3418; "Standard Test Method for Transition Temperatures and Enthalpies of Fusion and Crystallization of Polymers by Differential Scanning Calorimetry"; Published Sep. 2021.

ASTMD4603; "Standard Test Method for Determining Inherent Viscosity of Poly(Ethylene Terephthalate) (PET) by Glass Capillary Viscometer"; Published Jun. 2018.

Chen et al., "The molecular basis for the relationship between the secondary relaxation and mechanical properties of a series of polyester copolymer glasses," Marcromolecules, 32:5944-5955 (1999).

Coover, H. et al., "Copolyester Molding Compositions," Chemical Abstracts Service, XP002391844, Jun. 1970.

Kelsey, E. et al., "High Impact, Amorphous Terephthalate Copolyesters of Rigid 2,2,4,4-Tetramethyl-1,3-cyclobutanediol with Flexible Diols," Macromolecules, vol. 33, 2000, pp. 5810-5818, American Chemical Society.

"Plastic Additives Handbook," $5^{th}$ Edition, 2001, pp. 98-108 and pp. 109-112 (Hanser Gardner Publications, Inc., Cincinnati, OH.

Bergen, R. L., Jr., "Stress Cracking of Rigid Thermoplastics," SPE Journal, Jun. 1962.

Scheirs, John, et al., "Modern Polyesters: Chemistry and Technology of Polyesters and Copolyesters," Technology & Engineering, 2003, p. 287.

Fox equation (T.G. Fox, Session J, Bull. Am. Phys. Soc., 1, 123 (1956)).

*The Technology of Plasticizers*, by J. Kern Sears and Joseph R Darby, published by Society of Plastic Engineers-Wiley and Sons, New York, 1982; pp. 136-139.

Martinez et al., "*Phase Behavior and Mechanical Properties of Injection Molded Poly* (*Ethylene Terephthalate* )—*Polyarylate Blends*"; Journal of Applied Polymer Science, John Wiley and Sons Inc. New York, US, vol. 45, No. 7, Jul. 5, 1992 (Jul. 5, 1992), p. 1135-1143.

Won Ho Jo et al. : :*Miscibility of poly*(*ether imide*)-*poly*(*ethylene terephthalate*) *blends*; Polymer Bulletin, Springer, Heidelberg, DE, vol. 33, No. 1, Jun. 1, 1994 (Jun. 1, 1994), p. 113-118 (1994).

Anonymous: "*Poly* (*ethylene naphthalenedicarboxylate*)-*polyetherimide blends*" Research Disclosure, Mason Publications, Hampshire, GB, vol. 283, No. 38, Nov. 1987 (Nov. 1987).

Shearer, N.H., "T18-Type 1 Polyesters," Mar. 1966, SPE Annual Technical Conference and Exhibition, XP009080224.

Gachter, Muller, "Taschenbuch der Kunststoff-Additive," 1990, Carl Hanser Verlag Munchen Wien, XP02450422, pp. 96-97.

Gachter, Muller, "Kunstoff-Additive," 1990, Carl Hanser Verlag Munchen Wien, XP 02449987, pp. 96-99.

Brown, R., "Taschenbuch Kunstoff-Additive", 1990, Carl Hanswer Verlag Munchen Wiel, XP002455247, pp. 361-363.

Chang, S. et al., "Effect of Stabilizers on the Preparation of Poly(ethylene Terephthalate)", Journal of Polymer Science, Polymer Chemistry Edition, 1982, vol. 20, pp. 2053-2061, John Wiley & Sons, Inc.

Dixon, E.R. et al., "The Inter-Relation of Some Mechanical Properties with Molecular Weight and Crystallinity in Poly(ethylene terephthalate)", 1968, pp. 464-470, Journal of Materials Science, vol. 3.

Ellis, Thomas S., "Miscibility of Polyamide Blends: Effects of Configuration," 1995, Polymer, vol. 36, Issue 20, pp. 3919-3926.

Buschow, K.H.J., et al., "Packaging: Papers for Sacks and Bags," 2001, Encyclopedia of Materials: Science and Technology, vol. 8, Elsevier, pp. 6646-6652.

Coles, Richard, et al., "Food Packaging Technology," 2003, pp. 194-195 and 224-229, Blackwell Publishing.

Sajiki, Junko, et al., "Leaching of Bisphenol A (BPA) to Seawater from Polycarbonate Plastic and its Degradation by Reactive Oxygen Species," 2003, Chemosphere, 51, pp. 55-62.

Gupta, V.B. et al., "PET Fibers, Films, and Bottles: Section 5-7", Handbook of Thermoplastic Polyesters: Homopolymers, Copolymers, Blends, and Composites, 2005, pp. 362-388, Wiley InterScience.

Turner, S.R., et al., "Amorphous and Crystalline Polyesters based on 1,4-Cyclohexanedimethanol", Chapter 7, Modern Polyesters: Chemistry and Technology of Polyesters and Copolyesters, Edited by J. Sheirs and T.E. Long, 2003 John Wiley & Sons, Ltd., pp. 267-292.

Zipper, Marcus D., et al., "A Free vol. Study of Miscible Polyester Blends," 1995, pp. 127-136, Polymer, vol. 36.

Lobo, Hubert et al, "Handbook of Plastics Analysis," 2003, pp. 20 and 21, Marcel Dekker, Inc.

Al-Malaika, S., "Stabilization", Encyclopedia of Polymer Science and Technology, vol. 4, 2001, pp. 179-229, John Wiley & Sons, Inc.

Co-pending U.S. Appl. No. 18/681,961, filed Feb. 7, 2024; Stafford et al.

Co-pending U.S. Appl. No. 18/726,145, filed Jul. 2, 2024; Stafford et al.

Co-pending U.S. Appl. No. 18/862,688, filed Nov. 4, 2024; An et al.

Notification of Transmittal of The International Search Report and The Written Opinion of the International Searching Authority, or the Declaration; International Application No. PCT/US2021/058519 with a Date of Mailing Feb. 28, 2022.

Notification of Transmittal of the International Search Report and the Written Opinion of the International Searching Authority with Date of Mailing Oct. 10, 2022 for International Application No. PCT/CN2022/070796.

Notification of Transmittal of The International Search Report and The Written Opinion of the International Searching Authority, or the Declaration; International Application No. PCT/US2022/039255 with a Date of Mailing Nov. 14, 2022.

Notification of Transmittal of The International Search Report and The Written Opinion of the International Searching Authority, or the Declaration; International Application No. PCT/CN2022/094677 with a Date of Mailing Dec. 16, 2022.

European Search Report; Application No. 22761748.7 dated Feb. 18, 2025.

European Search Report Application No. 22943050.9 dated Mar. 2, 2026.

* cited by examiner

MOLDED ARTICLES FOR USE WITH TERPENE CONTAINING OILS

CROSS-REFERENCE TO RELATED APPLICATION(S)

This application is a national stage filing under 35 USC § 371 of International Application Number PCT/US2021/058519, filed on, Nov. 9, 2021 which claims the benefit of the filing date to U.S. Provisional Application No. 63/114,767, filed on Nov. 17, 2020, the entire disclosures of which are incorporated by reference herein.

FIELD OF THE INVENTION

This invention belongs to the field of polymer-based resins useful for forming articles or components of articles intended for contact with terpene containing oils. Plastic articles or components for such articles made using these compositions, such as vaporizers, nebulizers, humidifiers, air fresheners, or hand-held vapor delivery devices or components thereof are also provided.

BACKGROUND OF THE INVENTION

Plastics are a preferred material for making small devices that can be used to deliver a vapor or suspension of a chemical composition based on the relative efficiency of molding parts and articles of various shapes and designs. For example, devices used to deliver/produce a vapor or suspension, such as vaporizers, nebulizers, humidifiers, air fresheners, or hand-held vapor delivery devices, are often manufactured by molding plastic parts that form an assembly to produce the device.

However, when plastics are used in applications where contact with chemicals will occur, there is the potential for cracking, crazing, softening, etc. of the plastic induced by the chemical environment. An especially aggressive class of chemicals is terpene containing oils such as those used for flavoring and fragrance. Many plastics are adversely affected by these chemicals. Thus, there is a need for plastic materials that have resistance to such chemicals, are easily formed into articles, and maintain acceptable physical properties.

It would be beneficial to be able to provide polymer-based resins that can be melt processed and articles made from such compositions that do not have such drawbacks.

SUMMARY OF THE INVENTION

Surprisingly, it had been discovered that articles molded from certain copolyester plastics have exceptional resistance to terpene containing oils and maintain sufficient physical properties required for the intended use of the articles. In embodiments, such articles are useful as containers and/or other components in vapor delivery devices that will have significant contact with terpene containing oils in use. In one aspect, articles configured to receive a terpene containing oil composition can be made from compositions of copolyesters that can be prepared having excellent chemical resistance to the terpene containing oil composition and a glass transition temperature (Tg) exceeding 95° C., or 100° C.

It has been discovered that shaped articles configured to receive a terpene containing oil composition can be prepared from copolyester plastic materials that have resistance to the terpene containing oils and have physical properties similar to or better than molded articles produced from other typically used oil-based engineering thermoplastics. More specifically, these shaped articles are produced from a copolyester composition that retains its physical properties better than the other plastics after exposure to the terpene containing oils.

In one aspect of the invention, it is directed to a shaped article configured to receive a terpene containing oil composition and comprising a copolyester composition, wherein the copolyester composition has a Tg of at least 95° C., or at least 100° C., and has at least one of the following properties chosen from: tensile modulus of greater than 1400 MPa as measured according to ASTM D638 using a 3.2 mm thick bar that has been subjected to 50% relative humidity for 40 hours at 23° C.; a notched izod impact strength of greater than 1000 J/m as measured according to ASTM D256 at 23° C. using a 3.2 mm thick bar that has been subjected to 50% relative humidity for 40 hours at 23° C.; a tensile stress at yield of at least 40 MPa, measured according to ASTM D638; a transmission of at least 70 measured according to ASTM D1003 using a 3.2 mm plaque after injection molding at a barrel set point of 249° C. and a mold temperature of 80° C.; or an L* color of at least 85, measured according to ASTM E1348 using a 3.2 mm plaque after injection molding with a barrel temperature of 249° C. and a mold temperature of 80° C. In embodiments, the copolyester composition has at least 2, or at least 3 of the listed properties.

In embodiments of the invention, the shaped articles or components thereof can be chosen from injection molded articles, extrusion molded articles, rotational molded articles, compression molded articles, blow molded articles, injection blow molded articles, injection stretch blow molded articles, extrusion blow molded articles, sheet or film extrusion articles, profile extrusion articles, gas assist molding articles, structural foam molded articles, or thermoformed articles.

In embodiments of the invention, the shaped article is chosen from opaque articles, transparent articles, see-through articles, thin-walled articles, technical articles (e.g., articles having a complex design), articles having high design specifications, intricate design articles, containers for holding a terpene containing oil composition, or other shaped articles configured to receive (or contact) a terpene containing oil composition.

In embodiments, the technical articles, articles having high design specifications, and intricate design articles can be chosen from articles that include electrical/electronic components, perfume or cosmetic containers, vapor delivery devices, or components thereof.

In one embodiment of the injection molded article, the copolyester composition further comprises at least one property chosen from: tensile modulus of greater than 1400 MPa as measured according to ASTM D638 using a 3.2 mm thick bar that has been subjected to 50% relative humidity for 40 hours at 23° C.; a notched izod impact strength of greater than 1000 J/m as measured according to ASTM D256 at 23° C. using a 3.2 mm thick bar that has been subjected to 50% relative humidity for 40 hours at 23° C.; a tensile stress at yield of at least 40 MPa, measured according to ASTM D638; a transmission of at least 70 measured according to ASTM D1003 using a 3.2 mm plaque after injection molding at a barrel set point of 249° C. and a mold temperature of 80° C.; a ΔE value of less than 25, using a 3.2 mm plaque after injection molding with a barrel temperature of 249° C. and a mold temperature of 80° C.; or an L* color of at least 85, measured according to ASTM E1348 using a 3.2 mm plaque after injection molding with a barrel temperature of 249° C. and a mold temperature of 80° C. In embodiments, the polymer-based resin comprises at least 2, or at least 3 of the listed properties.

In embodiments in accordance with the various aspects of the invention disclosed herein, the copolyester composition comprises at least one copolyester which comprises:

(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.60 to 1.2 dL/g as determined in 60/40 (wt/wt) phenol/tetrachloroethane at a concentration of 0.5 g/100 ml at 25° C.; and wherein the polyester has a Tg of 95° C. to 115° C.

In embodiments in accordance with the various aspects of the invention disclosed herein, the copolyester composition comprises at least one copolyester which comprises:

(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.60 to 1.0 dL/g as determined in 60/40 (wt/wt) phenol/tetrachloroethane at a concentration of 0.5 g/100 ml at 25° C.; and wherein the polyester has a Tg of 95° C. to 115° C.

In embodiments, the dicarboxylic acid component comprises:

i) 95 to 100 mole % of terephthalic acid (TPA) residues; and
ii) 0 to 5 mole % of isophthalic acid (IPA) residues.

In embodiments, the dicarboxylic acid component comprises residues as follows: greater than 95 to 100 mole % TPA and 0 to less than 5 mole % IPA; 96 to 100 mole % TPA and 0 to 4 mole % IPA; 96.5 to 100 mole % TPA and 0 to 3.5 mole % IPA; 97 to 100 mole % TPA and 0 to 3 mole % IPA; 98 to 100 mole % TPA and 0 to 2 mole % IPA; 98.5 to 100 mole % TPA and 0 to 1.5 mole % IPA; 95 to 98.5 mole % TPA and 1.5 to 5 mole % IPA; greater than 95 to 98.5 mole % TPA and 1.5 to less than 5 mole % IPA; 96 to 98.5 mole % TPA and 1.5 to 4 mole % IPA; 96.5 to 98.5 mole % TPA and 1.5 to 3.5 mole % IPA; 97 to 98.5 mole % TPA and 1.5 to 3 mole % IPA; 97.5 to 98.5 mole % TPA and 1.5 to 2.5 mole % IPA; 95 to 98 mole % TPA and 2 to 5 mole % IPA; greater than 95 to 98 mole % TPA and 2 to less than 5 mole % IPA; 96 to 98 mole % TPA and 2 to 4 mole % IPA; 96.5 to 98 mole % TPA and 2 to 3.5 mole % IPA; or 97 to 98 mole % TPA and 2 to 3 mole % IPA.

In embodiments, the glycol component comprises:

i) 7 to 15 mole % of 2,2,4,4-tetramethyl-1,3-cyclobutanediol (TMCD) residues; and
ii) 85 to 93 mole % of 1,4-cyclohexanedimethanol (CHDM) residues.

In embodiments, the glycol component comprises residues as follows: 8 to 15 mole % TMCD and 85 to 92 mole % CHDM; 8 to 14 mole % TMCD and 86 to 92 mole % CHDM; 8 to 13 mole % TMCD and 87 to 92 mole % CHDM; 8 to 12 mole % TMCD and 88 to 92 mole % CHDM; 9 to 15 mole % TMCD and 85 to 91 mole % CHDM; 9 to 14 mole % TMCD and 86 to 91 mole % CHDM; 9 to 13 mole % TMCD and 87 to 91 mole % CHDM; 9 to 12 mole % TMCD and 88 to 91 mole % CHDM; 10 to 15 mole % TMCD and 85 to 90 mole % CHDM; 10 to 14 mole % TMCD and 86 to 90 mole % CHDM; 10 to 13 mole % TMCD and 87 to 90 mole % CHDM; or 10 to 12 mole % TMCD and 88 to 90 mole % CHDM.

In embodiments, the copolyester composition comprises at least one copolyester which comprises:

(a) a dicarboxylic acid component comprising:
  i) 98 to 100 mole %, or 100 mole %, of terephthalic acid residues;
(b) a glycol component comprising:
  i) 10 to 14 mole %, or 11 to 13 mole %, of 2,2,4,4-tetramethyl-1,3-cyclobutanediol residues; and
  ii) 88 to 90 mole %, or 87 to 89 mole %, of 1,4-cyclohexanedimethanol residues, wherein the total mole % of the dicarboxylic acid component is 100 mole %, and the total mole % of the glycol component is 100 mole %; and wherein the inherent viscosity is 0.70 to 1.0 dL/g, or 0.75 to 0.95 dL/g as determined in 60/40 (wt/wt) phenol/tetrachloroethane at a concentration of 0.5 g/100 ml at 25° C.; and wherein the polyester has a Tg of 100° C. to 115° C.

In embodiments, the copolyester composition comprises at least one copolyester which comprises:

(a) a dicarboxylic acid component comprising:
  i) 97.1 to 98.5 mole %, or 97.3 to 98.3 mole %, of terephthalic acid residues; and
  ii) 1.5 to 2.9 mole %, or 1.7 to 2.7 mole %, of isophthalic acid residues;
(b) a glycol component comprising:
  i) 10 to 12 mole % of 2,2,4,4-tetramethyl-1,3-cyclobutanediol residues; and
  ii) 88 to 90 mole % of 1,4-cyclohexanedimethanol residues, wherein the total mole % of the dicarboxylic acid component is 100 mole %, and the total mole % of the glycol component is 100 mole %; and wherein the inherent viscosity is 0.70 to 1.0 dL/g, or 0.75 to 0.95 dL/g as determined in 60/40 (wt/wt) phenol/tetrachloroethane at a concentration of 0.5 g/100 ml at 25° C.; and wherein the polyester has a Tg of 100° C. to 115° C. In embodiments, the at least one copolyester is a melt blended copolyester having an IV of 0.70 to 0.90 dL/g, or 0.75 to 0.85 dL/g, or 0.79 to 0.82 dL/g. In embodiments, the melt blended copolyester is solid stated to increase the IV. In embodiments, the solid stated copolyester has an IV from 0.80 to 1.0 dL/g, or 0.85 to 1.0 dL/g, or 0.87 to 0.97 dL/g, or 0.90 to 0.95 dL/g.

In embodiments, the copolyester composition is amorphous. In other embodiments, the copolyester composition is semi-crystalline.

In embodiments, the at least one copolyester is a reactor grade polyester prepared by a process that includes a transesterification reaction of reaction mixture that includes all the monomers for the intended (monomeric) residues to be included in the copolyester. For example, a copolyester intended to include residues of TPA, CHDM and TMCD is prepared by a transesterification reaction that includes each of these monomers. In an embodiment, the reactor grade polyester is amorphous.

In embodiments, the at least one copolyester is a melt blend polyester prepared by a process that includes melt blending at least two different starting polyesters to provide a final copolyester that includes the monomeric residues contained in starting polyesters. For example, a PCTA copolyester containing residues of TPA, IPA and CHDM is melt blended with a PCTM copolyester containing residues of TPA, CHDM and TMCD to provide a final copolyester having residues of TPA, IPA, CHDM and TMCD. In embodiments, the melt blended copolyester has residues in (net) amounts according to any of the embodiments for the copolyester (as described herein).

In embodiments, the melt blended copolyester is subjected to solid stating to increase the inherent viscosity (IV) of the copolyester. In embodiments, the solid stated copolyester has an IV according to any of the embodiments for the copolyester (as described herein).

In embodiments, a system for vapor delivery of a terpene containing oil composition is provided that comprises a shaped article configured to receive a terpene containing oil composition and a terpene containing oil composition, wherein the shaped article comprises one or more surfaces in contact with the terpene containing oil composition and/or configured to contact the terpene containing oil composition when the system is used for its intended purpose, and wherein the one or more surfaces are formed from a copolyester composition (as described herein). In embodiments, a majority of the surfaces that are in contact with the terpene containing oil composition and/or configured to contact the terpene containing oil composition when the system is used for its intended purpose are formed from the copolyester composition.

In embodiments, the terpene containing oil composition is in the form of a liquid and/or a vapor. In embodiments, the system comprises a shaped article that comprises one or more liquid contact surfaces in contact with a liquid terpene containing oil composition and one or more vapor contact surfaces configured to contact a vapor terpene containing oil composition when the system is used for its intended purpose. In one embodiment, the one or more liquid contact surfaces and the one or more vapor contact surfaces are in fluid communication and the vapor terpene containing oil composition is produced by vaporizing the liquid terpene containing oil composition. In one embodiment, the system comprises a shaped article that comprises one or more surfaces in contact with both a liquid terpene containing oil composition and a vapor terpene containing oil composition.

In embodiments, the system comprises a shaped article that comprises one or more liquid contact surfaces in contact with a liquid terpene containing oil composition for at least 5 minutes. In embodiments, the system comprises a shaped article that comprises one or more vapor contact surfaces in contact with a vapor terpene containing oil composition repetitively for a total contact time of at least 5 minutes.

In embodiments, the terpene containing oil composition comprises a terpene containing oil that is present in an amount of at least 25 wt %, based on the total weight of the terpene containing oil composition.

DETAILED DESCRIPTION

In one aspect of the invention, it is directed to a shaped article configured to receive a terpene containing oil composition and comprising a copolyester composition, wherein the copolyester composition has a Tg of at least 95° C., or at least 100° C., comprises a copolyester (as described herein), and has at least one of the following properties chosen from: tensile modulus of greater than 1400 MPa as measured according to ASTM D638 using a 3.2 mm thick bar that has been subjected to 50% relative humidity for 40 hours at 23° C.; a notched izod impact strength of greater than 1000 J/m as measured according to ASTM D256 at 23° C. using a 3.2 mm thick bar that has been subjected to 50% relative humidity for 40 hours at 23° C.; a tensile stress at yield of at least 40 MPa, measured according to ASTM D638; a transmission of at least 70 measured according to ASTM D1003 using a 3.2 mm plaque after injection molding at a barrel set point of 249° C. and a mold temperature of 80° C.; a ΔE value of less than 25, using a 3.2 mm plaque after injection molding with a barrel temperature of 249° C. and a mold temperature of 80° C.; or an L* color of at least 85, measured according to ASTM E1348 using a 3.2 mm plaque after injection molding with a barrel temperature of 249° C. and a mold temperature of 80° C. In embodiments, the polymer-based resin has at least 2, or at least 3 of the listed properties.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically, the difunctional carboxylic acid can be a dicarboxylic acid and the difunctional hydroxyl compound can be a dihydric alcohol such as, for example, glycols and diols. The term "glycol" as used in this application includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. Furthermore, as used in this application, the term "diacid" includes multifunctional acids, for example, branching agents. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material. In embodiments, at least a portion of the terephthalic acid or dimethyl terephthalate used as a starting material has recycle content derived directly or indirectly from recycle waste. In embodiments, the recycle content can be obtained from waste plastic that contains terephthalic acid residues, e.g., recovered monomers obtained through a solvolysis (e.g., methanolysis) process. In embodiments, the terephthalic acid residues present in the polyester (according to any of the embodiments herein) contains at least 50 mole %, or at least 75 mole %, or 100 mole % recycle content. In embodiments, the dicarboxylic acid component of the polyester comprises monomer residues having at least 50 mole % recycle content, or at least 75 mole % recycle content, or 100 mole % recycle content.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compounds) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 4 mole % isophthalic acid, based on the total acid residues, means the polyester contains 4 mole % isophthalic acid residues out of a total of 100 mole % acid residues. Thus, there are 4 moles of isophthalic acid residues among every 100 moles of acid residues. In another example, a polyester containing 15 mole % 2,2,4,4-tetramethyl-1,3-cyclobutanediol, based on the total diol residues, means the polyester contains 15 mole % 2,2,4,4-tetramethyl-1,3-cyclobutanediol residues out of a total of 100 mole % diol residues. Thus, there are 15 moles of 2,2,4,4-tetramethyl-1,3-cyclobutanediol residues among every 100 moles of diol residues.

In other aspects of the invention, the Tg of the polyesters useful in the invention can be at least one of the following ranges: 95 to 115° C.; 95 to 110° C.; 95 to 105° C.; 95 to 100° C.; 100 to 115° C.; 100 to 110° C.; 100 to 105° C.; 105 to 115° C.; 105 to 110° C.; and 110 to 115° C.

In other aspects of the invention, the glycol component for the polyesters useful in the invention include but are not limited to at least one of the following combinations of ranges: 5 to 15 mole % 2,2,4,4-tetramethyl-1,3-cyclobutanediol and 85 to 95 mole % 1,4-cyclohexanedimethanol; 5 to 14 mole % 2,2,4,4-tetramethyl-1,3-cyclobutanediol and 86 to 95 mole % 1,4-cyclohexanedimethanol; 5 to 13 mole % 2,2,4,4-tetramethyl-1,3-cyclobutanediol and 87 to 95 mole % 1,4-cyclohexanedimethanol; 5 to 12 mole % 2,2,4,4-tetramethyl-1,3-cyclobutanediol and 88 to 95 mole % 1,4-cyclohexanedimethanol; 5 to 11 mole % 2,2,4,4-tetramethyl-1,3-cyclobutanediol and 89 to 95 mole % 1,4-cyclohexanedimethanol; 6 to 15 mole % 2,2,4,4-tetramethyl-1,3-cyclobutanediol and 85 to 94 mole % 1,4-cyclohexanedimethanol; 6 to 14 mole % 2,2,4,4-tetramethyl-1,3-cyclobutanediol and 86 to 94 mole % 1,4-cyclohexanedimethanol; 6 to 13 mole % 2,2,4,4-tetramethyl-1,3-cyclobutanediol and 87 to 94 mole % 1,4-cyclohexanedimethanol; 6 to 12 mole % 2,2,4,4-tetramethyl-1,3-cyclobutanediol and 88 to 94 mole % 1,4-cyclohexanedimethanol; 6 to 11 mole % 2,2,4,4-tetramethyl-1,3-cyclobutanediol and 89 to 94 mole % 1,4-cyclohexanedimethanol; 7 to 15 mole % 2,2,4,4-tetramethyl-1,3-cyclobutanediol and 85 to 93 mole % 1,4-cyclohexanedimethanol; 7 to 14 mole % 2,2,4,4-tetramethyl-1,3-cyclobutanediol and 86 to 93 mole % 1,4-cyclohexanedimethanol; 7 to 13 mole % 2,2,4,4-tetramethyl-1,3-cyclobutanediol and 87 to 93 mole % 1,4-cyclohexanedimethanol; 7 to 12 mole % 2,2,4,4-tetramethyl-1,3-cyclobutanediol and 88 to 93 mole % 1,4-cyclohexanedimethanol; 7 to 11 mole % 2,2,4,4-tetramethyl-1,3-cyclobutanediol and 89 to 93 mole % 1,4-cyclohexanedimethanol; 8 to 15 mole % 2,2,4,4-tetramethyl-1,3-cyclobutanediol and 85 to 92 mole % 1,4-cyclohexanedimethanol; 8 to 14 mole % 2,2,4,4-tetramethyl-1,3-cyclobutanediol and 86 to 92 mole % 1,4-cyclohexanedimethanol; 8 to 13 mole % 2,2,4,4-tetramethyl-1,3-cyclobutanediol and 87 to 92 mole % 1,4-cyclohexanedimethanol; 8 to 12 mole % 2,2,4,4-tetramethyl-1,3-cyclobutanediol and 88 to 92 mole % 1,4-cyclohexanedimethanol; 8 to 11 mole % 2,2,4,4-tetramethyl-1,3-cyclobutanediol and 89 to 92 mole % 1,4-cyclohexanedimethanol; 9 to 15 mole % 2,2,4,4-tetramethyl-1,3-cyclobutanediol and 85 to 91 mole % 1,4-cyclohexanedimethanol; 9 to 14 mole % 2,2,4,4-tetramethyl-1,3-cyclobutanediol and 86 to 91 mole % 1,4-cyclohexanedimethanol; 9 to 13 mole % 2,2,4,4-tetramethyl-1,3-cyclobutanediol and 87 to 91 mole % 1,4-cyclohexanedimethanol; 9 to 12 mole % 2,2,4,4-tetramethyl-1,3-cyclobutanediol and 88 to 91 mole % 1,4-cyclohexanedimethanol; 9 to 11 mole % 2,2,4,4-tetramethyl-1,3-cyclobutanediol and 89 to 91 mole % 1,4-cyclohexanedimethanol; 10 to 15 mole % 2,2,4,4-tetramethyl-1,3-cyclobutanediol and 85 to 90 mole % 1,4-cyclohexanedimethanol; 10 to 14 mole % 2,2,4,4-tetramethyl-1,3-cyclobutanediol and 86 to 90 mole % 1,4-cyclohexanedimethanol; 10 to 13 mole % 2,2,4,4-tetramethyl-1,3-cyclobutanediol and 87 to 90 mole % 1,4-cyclohexanedimethanol; 10 to 12 mole % 2,2,4,4-tetramethyl-1,3-cyclobutanediol and 88 to 90 mole % 1,4-cyclohexanedimethanol; and 10 to 11 mole % 2,2,4,4-tetramethyl-1,3-cyclobutanediol and 89 to 90 mole % 1,4-cyclohexanedimethanol.

For certain embodiments of the invention, the polyesters useful in the invention may exhibit at least one of the following inherent viscosities as determined in 60/40 (wt/wt) phenol/tetrachloroethane at a concentration of 0.5 g/100 ml at 25° C.: 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g; 0.65 to 0.70 dL/g; or 0.65 to less than 0.70 dL/g; 0.70 to 1.2 dL/g; 0.70 to 1.1 dL/g; 0.70 to 1 dL/g; 0.70 to less than 1 dL/g; 0.70 to 0.98 dL/g; 0.70 to 0.95 dL/g; 0.70 to 0.90 dL/g; 0.70 to 0.85 dL/g; 0.70 to 0.80 dL/g; 0.70 to 0.75 dL/g; 0.70 to less than 0.75 dL/g; 0.75 to 1.2 dL/g; 0.75 to 1.1 dL/g; 0.75 to 1 dL/g; 0.75 to less than 1 dL/g; 0.75 to 0.98 dL/g; 0.75 to 0.95 dL/g; 0.75 to 0.90 dL/g; 0.75 to 0.85 dL/g; 0.75 to 0.80 dL/g; 0.75 to less than 0.80 dL/g; 0.80 to 1.2 dL/g; 0.80 to 1.1 dL/g; 0.80 to 1 dL/g; 0.80 to less than 1 dL/g; 0.80 to 0.98 dL/g; 0.80 to 0.95 dL/g; 0.80 to 0.90 dL/g; 0.80 to 0.85 dL/g; 0.80 to less than 0.85 dL/g; 0.85 to 1.2 dL/g; 0.85 to 1.1 dL/g; 0.85 to 1 dL/g; 0.85 to less than 1 dL/g; 0.85 to 0.98 dL/g; 0.85 to 0.95 dL/g; 0.85 to 0.90 dL/g; 0.85 to less than 0.90 dL/g; 0.90 to 1.2 dL/g; 0.90 to 1.1 dL/g; 0.90 to 1 dL/g; 0.90 to less than 1 dL/g; 0.90 to 0.98 dL/g; 0.90 to 0.95 dL/g; or 0.90 to less than 0.95 dL/g. It is contemplated that the polyester compositions of the invention can possess at least one of the inherent viscosity ranges described herein and at least one of the monomer ranges for the compositions described herein unless otherwise stated. It is also contemplated that the polyester compositions of the invention can possess at least one of the Tg ranges described herein and at least one of the monomer ranges for the compositions described herein unless otherwise stated. It is also contemplated that the polyester compositions of the invention can possess at least one of the Tg ranges described herein, at least one of the inherent viscosity ranges described herein, and at least one of the monomer ranges for the compositions described herein unless otherwise stated.

For the desired polyester, the molar ratio of cis/trans 2,2,4,4-tetramethyl-1,3-cyclobutanediol can vary from the pure form of each or mixtures thereof. In certain embodiments, the molar percentages for cis and/or trans 2,2,4,4-tetramethyl-1,3-cyclobutanediol are greater than 50 mole % cis and less than 50 mole % trans; or greater than 55 mole % cis and less than 45 mole % trans; or 30 to 70 mole % cis and 70 to 30% trans; or 40 to 60 mole % cis and 60 to 40 mole % trans; or 50 to 70 mole % trans and 50 to 30 mole % cis; or 50 to 70 mole % cis and 50 to 30% trans or 60 to 70 mole % cis and 30 to 40 mole % trans; or greater than 70 mole % cis and less than 30 mole % trans; wherein the total sum of the mole percentages for cis- and trans-2,2,4,4-tetramethyl-1,3-cyclobutanediol is equal to 100 mole %. The molar ratio of cis/trans 1,4-cyclohexanedimethanol can vary within the range of 50/50 to 0/100, for example, between 40/60 to 20/80. The cis/trans ratio of the compositions can determined by proton nuclear magnetic resonance (NMR) spectroscopy.

In certain embodiments, terephthalic acid, or an ester thereof, such as, for example, dimethyl terephthalate, or a mixture of terephthalic acid and an ester thereof, makes up most or all of the dicarboxylic acid component used to form the polyesters useful in the invention. In certain embodiments, terephthalic acid residues can make up a portion or all of the dicarboxylic acid component used to form the present polyester at a concentration of at least 70 mole %, such as at least 80 mole %, at least 90 mole %, at least 95 mole %, at least 99 mole %, or, in one preferred embodiment (e.g., reactor grade), 100 mole %. In certain embodiments, polyesters with higher amounts of terephthalic acid can be used in order to produce higher impact strength properties. For purposes of this disclosure, the terms "terephthalic acid" and "dimethyl terephthalate are used interchangeably herein. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In certain embodiments, in addition to terephthalic acid residues, the dicarboxylic acid component of the polyesters useful in the invention can comprise up to 30 mole %, up to 20 mole %, up to 10 mole %, up to 5 mole %, or less than 5 mole %, or up to 3 mole %, or up to 1 mole % of one or more modifying aromatic dicarboxylic acids. In one preferred embodiment, the polyester contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, from 0.01 to 20 mole %, from 0.01 to 10 mole %, from 0.01 to 5 mole %, from 0.01 to less than 5 mole %, from 0.01 to 4 mole %, from 0.01 to 3 mole %, from 0.01 to 2 mole %, or from 0.01 to 1 mole % of one or more modifying aromatic dicarboxylic acids. In certain embodiments, the amount of one or more modifying aromatic dicarboxylic acids can range from 1 to 5 mole %, from 1 to less than 5 mole %, from 1 to 4 mole %, from 1 to 3 mole %, from 1 to 2 mole %, or from 1.5 to 5 mole %, from 1.5 to less than 5 mole %, from 1.5 to 4 mole %, from 1.5 to 3.5 mole %, from 1.5 to 3 mole %, from 1.5 to 2.5 mole %, from 1.5 to 2 mole %, or from 2 to 5 mole %, from 2 to less than 5 mole %, from 2 to 4 mole %, from 2 to 3.5 mole %, from 2 to 3 mole %, from 2 to 2.5 mole %, or from 2.5 to 5 mole %, from 2.5 to less than 5 mole %, from 2.5 to 4 mole %, from 2.5 to 3.5 mole %, from 2.5 to 3 mole %, or from 3 to 5 mole %, from 3 to less than 5 mole %, from 3 to 4 mole %, from 3 to 3.5 mole %, or from 3.5 to 5 mole %, from 3.5 to less than 5 mole %, from 3.5 to 4 mole %, from 4 to 5 mole %, from 4 to less than 5 mole %, of one or more modifying aromatic dicarboxylic acids.

In one embodiment, modifying aromatic dicarboxylic acids that may be used in the present invention include but are not limited to those having up to 20 carbon atoms, and that can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenecarboxylic acid, and esters thereof. In one embodiment, isophthalic acid is the modifying aromatic dicarboxylic acid. The preferred embodiment of the invention is for 100% of the dicarboxylic acid component based on terephthalic acid residues.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, malonic, succinic, glutaric, adipic, pimelic, suberic, azelaic and dodecanedioic dicarboxylic acids. Certain embodiments can also comprise 0.01 or more mole %, such as 0.1 or more mole %, 1 or more mole %, 5 or more mole %, or 10 or more mole % of one or more modifying aliphatic dicarboxylic acids. In one preferred embodiment, the polyester contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

The 1,4-cyclohexanedimethanol may be cis, trans, or a mixture thereof, for example, a cis/trans ratio of 60:40 to 40:60. In another embodiment, the trans-1,4-cyclohexanedimethanol can be present in the amount of 60 to 80 mole %.

The glycol component of the polyester portion of the polyester compositions useful in the invention can contain 14 mole % or less of one or more modifying glycols which are not 2,2,4,4-tetramethyl-1,3-cyclobutanediol or 1,4-cyclohexanedimethanol; in another embodiment, the polyesters useful in the invention can contain 10 mole % or less of one or more modifying glycols. In another embodiment, the polyesters useful in the invention can contain 5 mole % or less of one or more modifying glycols. In another embodiment, the polyesters useful in the invention can contain 3 mole % or less of one or more modifying glycols. In the preferred embodiment, the polyesters useful in the invention may contain 0 mole % modifying glycols. Certain embodiments can also contain 0.01 or more mole %, such as 0.1 or more mole %, 1 or more mole %, 5 or more mole %, or 10 or more mole % of one or more modifying glycols. Thus, if present, it is contemplated that the amount of one or more modifying glycols can range from any of these preceding endpoint values including, for example, from 0.1 to 10 mole %.

Modifying glycols useful in the polyesters useful in the invention refer to diols other than 2,2,4,4-tetramethyl-1,3-cyclobutanediol and 1,4-cyclohexanedimethanol and may contain 2 to 16 carbon atoms. Examples of suitable modifying glycols include, but are not limited to, ethylene glycol, diethylene glycol, 1,2-propanediol, 1,3-propanediol, neopentyl glycol, 1,4-butanediol, 1,5-pentanediol, 1,6-hexanediol, p-xylene glycol or mixtures thereof. In one embodiment, the modifying glycol is ethylene glycol. In another embodiment, the modifying glycols include but are not limited to 1,3-propanediol and/or 1,4-butanediol. In another embodiment, ethylene glycol is excluded as a modifying diol. In another embodiment, 1,3-propanediol and 1,4-butanediol are excluded as modifying diols. In another embodiment, 2,2-dimethyl-1,3-propanediol is excluded as a modifying diol. The polyesters useful the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, or 0.1 to 0.5 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the invention can thus be linear or branched. In certain embodiments, the branching monomer or agent may be added prior to and/or during and/or after the polymerization.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters useful in the invention can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

The polyesters useful in this invention can also be prepared by reactive melt blending and extrusion of two polyesters. For example: a polyester containing 100% terephthalic acid residues; 10 mole % 2,2,4,4-tetramethyl-1,3-cyclobutanediol residues, and 90 mole % 1,4-cyclohexanedimethanol can be prepared by reactive melt blending and extrusion of equal amounts of a polyester containing 100 mole % terephthalic residues and 100% 1,4-cyclohexanedimethanol with another polyester containing 100 mole % terephthalic residues; 80 mole % 1,4-cyclohexanedimethanol residues, and 20 mole % 2,2,4,4-tetramethyl-1,3-cyclobutanediol residues.

In embodiments, the polyesters of this invention, prepared in a reactor or by melt blending/extrusion, can subsequently be crystallized if needed and solid stated by techniques known in the art to further increase the IV.

In embodiments, the article made from copolyester composition can be amorphous. For purposes of this disclosure, amorphous means a crystallinity or less than 1%. In other embodiments, the article made from copolyester composition can be semi-crystalline, e.g., by crystallizing with heat. In embodiments, the article of the invention has a crystallinity of from 1 to 40%, or 1 to 35%, or 1 to 30%, or 5 to 40%, or 5 to 35%, or 5 to 30%, or 10 to 40%, or 10 to 35%, or 10 to 30%.

In other embodiments, the article made from the copolyester composition can have strain induced crystallinity. Strain induced crystallization refers to a phenomenon in which an initially amorphous solid material undergoes a phase transformation in which some amorphous domains are converted to crystalline domains due to the application of strain. This phenomenon has important effects in strength and fatigue properties.

In embodiments, the article of the invention has a strain induced crystallinity of from 1 to 40%, or 1 to 35%, or 1 to 30%, or 5 to 40%, or 5 to 35%, or 5 to 30%, or 10 to 40%, or 10 to 35%, or 10 to 30%, when stretched at a temperature above the Tg of the polyester, e.g., during molding or forming processes, such as stretch blow molding.

In embodiments, the article is a clear semi-crystalline article comprising a copolyester that has a crystallization half-time of less than 10 minutes but greater than about 30 seconds. In embodiments, the copolyester has a crystallization half-time from 30 seconds to 5 minutes, or 30 seconds to 3 minutes, or 30 seconds to 2 minutes, or 30 seconds to 1.5 minutes.

In embodiments, the article of the invention can comprise the polyester of the invention having a melting temperature (Tm) from 260° C. to 300° C.

In addition, the polyester useful in this invention may also contain from 0.01 to 25% by weight or 0.01 to 20% by weight or 0.01 to 15% by weight or 0.01 to 10% by weight or 0.01 to 5% by weight of the total weight of the polyester composition of common additives such as colorants, dyes, mold release agents, reheat additives, flame retardants, plasticizers, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers; functionalized polyolefins, such as those containing methyl acrylate and/or glycidyl methacrylate; styrene-based block copolymeric impact modifiers; and various acrylic core/shell type impact modifiers. For example, UV additives can be incorporated into articles of manufacture through addition to the bulk, through application of a hard coat, or through coextrusion of a cap layer. Residues of such additives are also contemplated as part of the polyester composition.

The polyesters useful in the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, preferably about 0.1 to about 5 percent by weight, based on the total weight of the polyester.

Thermal stabilizers are compounds that stabilize polyesters during polyester manufacture and/or post polymerization including, but not limited to, phosphorous compounds including but not limited to phosphoric acid, phosphorous acid, phosphonic acid, phosphinic acid, phosphonous acid, and various esters and salts thereof. These can be present in the polyester compositions useful in the invention. The esters can be alkyl, branched alkyl, substituted alkyl, difunctional alkyl, alkyl ethers, aryl, and substituted aryl. In one embodiment, the number of ester groups present in the particular phosphorous compound can vary from zero up to the maximum allowable based on the number of hydroxyl groups present on the thermal stabilizer used. The term "thermal stabilizer" is intended to include the reaction products thereof. The term "reaction product" as used in connection with the thermal stabilizers of the invention refers to any product of a polycondensation or esterification reaction between the thermal stabilizer and any of the monomers used in making the polyester as well as the product of a polycondensation or esterification reaction between the catalyst and any other type of additive.

Reinforcing materials may be useful in the compositions of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials are glass, such as, fibrous glass filaments, mixtures of glass and talc, glass and mica, and glass and polymeric fibers.

In embodiments, the articles (configured to receive a terpene containing oil composition) can include, but are not limited to, injection blow molded articles, injection stretch blow molded articles, extrusion blow molded articles, extrusion stretch blow molded articles, calendered articles, compression molded articles, and solution casted articles. Methods of making the articles of manufacture, include, but are not limited to, extrusion blow molding, extrusion stretch blow molding, injection blow molding, injection stretch blow molding, calendering, compression molding, and solution casting.

In embodiments, the articles (configured to receive a terpene containing oil composition) can include film(s) and/or sheet(s) comprising the polyester compositions that are formed into the articles of the invention. The methods of forming the polyesters into film(s) and/or sheet(s) are well known in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

In embodiments of the invention, the copolyester composition has a notched izod impact strength of at least 800 J/m, or at least 900 J/m, as measured according to ASTM D256 using a 3.2 mm thick bar hat has been subjected to 50% relative humidity for 48 hours at 23° C. In certain embodiments, the polymer-based resin has a notched izod impact strength of at least 1000 J/m, or at least 1050 J/m, as measured according to ASTM D256 using a 3.2 mm thick bar that has been subjected to 50% relative humidity for 48 hours at 23° C.

In embodiments of the invention, the polymer-based resin has a ΔE value of less than 25, or less than 20, or less than 15, or less than 14, or less than 13, or less than 12, or less than 11, or less than 10, or less than 9, or less than 8, or less than 7, or less than 6, or less than 5, using a 3.2 mm plaque after injection molding with a barrel temperature of 249° C. and a mold temperature of 80° C., wherein ΔE is determined by the following equation: $((L^*-100)^2+(a^*-0)^2+(b^*-0)^2)^{1/2}$, where the L*, a*, and b* color components were measured according to ASTM E1348. In certain embodiments, the polymer-based resin has a ΔE value in the range from 2 to 25, or from 2 to 20, or from 2 to 15, or from 2 to 14, or from 2 to 13, or from 2 to 12, or from 2 to 11, or from 2 to 10, or from 2 to 9, or from 2 to 8, or from 2 to 7, or from 2 to 6, or from 2 to 5, using a 3.2 mm plaque after injection molding with a barrel temperature of 249° C. and a mold temperature of 80° C., wherein ΔE is determined by the following equation: $((L^*-100)^2+(a^*-0)^2+(b^*-0)^2)^{1/2}$, where the L*, a*, and b* color components were measured according to ASTM E1348.

In embodiments of the invention, the polymer-based resin has an L* color of at least 85, or at least 86, or at least 87, or at least 88, or at least 89, or at least 90, or at least 91, or at least 92, or at least 93, or at least 94, or at least 95, measured according to ASTM E1348 using a 3.2 mm plaque after injection molding with a barrel temperature of 249° C. and a mold temperature of 80° C. In certain embodiments, the polymer-based resin has an L* color in the range from 85 to 98, or from 85 to 97, or from 85 to 96, or from 85 to 95, measured according to ASTM E1348 using a 3.2 mm plaque after injection molding with a barrel temperature of 249° C. and a mold temperature of 80° C.

In embodiments of the invention, the polymer-based resin has a b* value is less than 15, or less than 12, or less than 10, or less than 9, or less than 8, or less than 7, or less than 6, or less than 5, or less than 4, measured according to ASTM E1348 using a 3.2 mm plaque after injection molding with a barrel temperature of 249° C. and a mold temperature of 80° C. In certain embodiments, the polymer-based resin has a b* color in the range from 0 to 15, or from 0 to 10, or from 0 to 8, or from 0 to 5, measured according to ASTM E1348 using a 3.2 mm plaque after injection molding with a barrel temperature of 249° C. and a mold temperature of 80° C.

In aspects of this invention, it is directed to shaped articles. In certain embodiments, the shaped articles are not continuously extruded films that are infinite (or continuous) in one direction and fixed in width and thickness in the other two directions, as would be the case in a rolled film. In certain embodiments, a film or sheet can be converted into a shaped article, e.g., by thermoforming into a three-dimensional object, such as a cup or bowl. In embodiments of the invention, the shaped article is not a film or is not a sheet. In embodiments of the invention, the shaped articles can be chosen from injection molded articles, extrusion molded articles, rotational molded articles, compression molded articles, blow molded articles, injection blow molded articles, injection stretch blow molded articles, extrusion blow molded articles, sheet or film extrusion articles, profile extrusion articles, gas assist molding articles, structural foam molded articles, or thermoformed articles.

Shaped articles made from polyester composition according to the present invention can be shaped via molding or extruding for use in vapor delivery applications. In embodiments of the invention, the shaped article is chosen from transparent articles, see-through articles, thin-walled articles, technical articles (e.g., articles having a complex design), articles having high design specifications, intricate design articles, containers, food contact articles, household articles, general consumer products, packaging articles, medical articles, or components thereof, where the article is configure to receive a terpene containing oil composition.

In certain embodiments, the polyester composition can be primary molded into forms such as pellets, plates, or parisons, and can then be secondary molded into articles, e.g., conduits, tubes, thin-wall vessels, or thick-wall vessels, configured to receive a terpene containing oil composition.

The methods of forming the polyester compositions into films, molded articles, and sheeting can be according to methods known in the art. In embodiments, the polyester composition can be over molded onto itself or a different polyester composition and retain an interface bond (or weld line) strength that will not separate (or delaminate) when an article (having such an over mold interface) is used for its intended purpose. In embodiments, transparent polyesters and translucent (or opaque) polyesters can be over molded onto the other. In embodiments, the different polyesters all fall with one or more embodiments of the invention (as discussed herein).

In one aspect, an article is provided that comprises a molded component configured to receive a terpene containing oil composition, where the molded component is formed of a plastic composition comprising a copolyester composition and having a Tg of at least 95° C.

In embodiments, a terpene containing oil composition is in contact with a surface of the molded component, wherein the terpene containing oil composition is in the form of a vapor. In embodiments, the molded component comprises a container configured to contain a terpene containing oil composition and selectively release the terpene containing oil composition. In embodiments, the molded component comprises a container configured to contain a terpene containing oil composition that is in a pre-vapor formulation form. In embodiments, the molded component comprises a conduit configured to convey a terpene containing oil composition. In embodiments, the molded component comprises a conduit configured to convey a terpene containing oil composition that is in a vapor form. In embodiments, the article comprises one or more molded components that comprise a container configured to contain a terpene containing oil composition and a conduit configured to convey a terpene containing oil composition, wherein the container and conduit are in fluid communication.

The terpene containing oil composition contains a terpene containing oil in an amount of at least 1 wt %, or at least 5 wt %, or at least 10 wt %, or at least 15 wt % or at least 20 wt %, or at least 25 wt %. Terpene containing oil means an oil that contains at least one terpene compound in an amount of at least 0.1 wt % based on the weight of the oil. In embodiments, the terpene containing oil composition contains at least 0.01, or at least 0.05, or at least 0.1, or at least 0.5, or at least 1, or at least 5, or at least 10 wt % of total terpene compounds.

In embodiments, the terpene containing oil is a terpene containing plant-based oil. Terpene containing plant-based oil means a type of oil that can be found in or obtained from plants and that comprises at least one terpene. The definition of plants is not to be limited and can include any type or classification of plants, including vascular, non-vascular, seed bearing, spore bearing, angiosperms, and gymnosperms. Plants can include small plants, bushes, or trees. In embodiments, the terpene containing plant-based oil can be synthesized or made without the oil actually being derived from plants, as long as the oil is of a type that can be found in or obtained from plants.

In embodiments, the terpene containing plant-based oil is a type found primarily in the leaves or flowers of a plant. In embodiments, the terpene containing plant-based oil is a type found primarily in the seeds or fruit of a plant. In embodiments, the terpene containing oil composition can be a combination (e.g., mixture or blend) of different plant-based oils with the proviso that the composition comprises at least one terpene containing plant-based oil.

In embodiments, the terpene containing oil composition comprises a plant-based oil. In embodiments, the plant-based oil is a botanical oil. Botanical oil means an oil of a type obtained from plants that are fatty, dense and non-volatile. In embodiments, the botanical oil is extracted from the root, stem/bark, leaves, flowers, seeds or fruit of a plant, tree or shrub. In embodiments, the botanical oil is cold pressed or extracted by heat. Examples of botanical oils can include rosehip oil (*rosa canina*), evening primrose oil (*Oenothera Biennis*), almond oil (*prunus amygdalus dulcis*), *calendula* oil (*Calendula Officinalis*), MCT oil, olive oil, canola oil, corn oil, vegetable oil, cotton seed oil, safflower oil, sunflower seed oil, soapbark tree oil; and extracts, isolates, or derivatives of the foregoing; and combinations of any of the foregoing.

In embodiments, the plant-based oil is an essential oil. Essential oil means a concentrated and volatile substance extracted from plants chosen from aromatic herbs or aromatic plants, where essential refers to an oil that carries a distinctive scent (or essence) of such a plant. Examples of essential oils can include agar oil or oodh, aiwain oil, *angelica* root oil, anise oil, asafetida oil, balsam of peru, basil oil, bay oil, bergamot oil, black pepper oil, buchu oil, birch oil, camphor oil, *cannabis* flower essential oil, calamodin oil or calamansi essential oil, caraway seed oil, cardamom seed oil, carrot seed oil, cedar oil, chamomile oil, *calamus* oil, cinnamon oil, *Cistus ladanifer*, citron oil, *citronella* oil, clary sage oil, coconut oil, clove oil, coffee oil, coriander oil, costmary oil, costus root oil, cranberry seed oil, cubeb oil, cumin seed oil or black seed oil, cypress oil, cypriol oil, curry leaf oil, *davana* oil, dill oil, elecampane oil, elemi oil, *eucalyptus* oil, fennel seed oil, fenugreek oil, fir oil, frankincense oil, galangal oil, *galbanum* oil, garlic oil, *geranium* oil, ginger oil, goldenrod oil, grapefruit oil, henna oil, *helichrysum* oil, hickory nut oil, horseradish oil, hyssop, Idaho-grown tansy, jasmine oil, juniper berry oil, *Laurus Nobilis*, lavender oil, *ledum* oil, lemon oil, lemongrass oil, lime oil, *Listea cubeba* oil, linalool oil, mandarin oil, marjoram oil, *melissa* oil or lemon balm, *Mentha arvensis* oil or mint oil, *moringa* oil, mountain savory oil, mugwort oil, mustard oil, myrrh oil, myrtle oil, neem oil, neroli oil, nutmeg oil, orange oil, oregano oil, orris oil, palo santo oil, parsley oil, patchouli oil, *perilla* essential oil, pennyroyal oil, peppermint oil, petitgrain oil, pine oil, *ravensara* oil, red cedar oil, romain chamomile oil, rose oil, rosehip oil, rosemary oil, rosewood oil, sage oil, sandalwood oil, *sassafras* oil, savory oil, *Schisandra* oil, spearmint oil, spikenard oil, spruce oil, star anise oil, tangerine oil, tarragon oil, *tea* tree oil, thyme oil, *tsuga* oil, turmeric oil, *warionia* oil, vetiver oil, western red cedar oil, wintergreen oil, yarrow oil, ylang-ylang oil; and extracts, isolates, or derivatives of the foregoing; and combinations of any of the foregoing. In embodiments, the extract, isolate or derivative of the essential oil comprises a terpene or a flavonoid. In embodiments, the terpene is chosen from d-limonene, geraniol, b-pinene, myrcene, terpinolene, or mixtures thereof.

In embodiments, the plant-based oil can be a combination of one or more botanical oils and one or more essential oils. In embodiments, the terpene containing oil composition comprises a terpene containing plant-based oil component, where the terpene containing plant-based oil component comprises one or more terpene containing plant-based oils chosen from a botanical oil, an essential oil, or combinations of botanical and essential oils. Examples of terpene containing plant-based oils include *eucalyptus* oil, lavender oil, neroli oil, *cannabis* oil, hemp oil, cannabidiol oil, peppermint oil, sweet orange oil, *tea* tree oil, lemon oil, lime oil, orange oil; and extracts, isolates, or derivatives of the foregoing oils and/or their plant source; and combinations of any of the foregoing.

In embodiments, the terpene containing oil composition comprises a terpene containing plant-based oil component and a terpene free plant-based oil component, where the terpene containing plant-based oil component comprises one or more terpene containing plant-based oils and the terpene free plant-based oil component comprises one or more plant-based oils that do not contain a terpene. In embodiments, the terpene containing oil composition further comprises one or more additional additives chosen from solvents, dispersants, stabilizers, emulsifiers, carriers, solvents, actives. In embodiments, the additional additive(s) can be chosen from glycols, e.g., propylene glycol, glycerin, e.g., plant glycerin, polysorbates, plant-based alkaloids, e.g., nicotine, or combinations thereof.

In embodiments, the copolyester composition forming the injection molded article is chosen from any of the copolyester compositions discussed herein. In one embodiment, the copolyester composition comprises at least one copolyester that comprises:

(a) a dicarboxylic acid component comprising:
  i) 96 to 100 mole % of terephthalic acid residues; and
  ii) 0 to 4 mole % of isophthalic acid residues;
(b) a glycol component comprising:
  i) 10 to 15 mole % of 2,2,4,4-tetramethyl-1,3-cyclobutanediol residues; and
  ii) 85 to 90 mole % of 1,4-cyclohexanedimethanol residues, wherein the total mole % of the dicarboxylic acid component is 100 mole %, and the total mole % of the glycol component is 100 mole %; and wherein the inherent viscosity is 0.70 to 1.0 dL/g, or 0.75 to 0.95 dL/g as determined in 60/40 (wt/wt) phenol/tetrachloroethane at a concentration of 0.5 g/1 00 ml at 25° C.; and wherein the polyester has a Tg of 10000 to 115° C.

Properties disclosed herein requiring a test method can be determined as follows:

Test Methods

Properties disclosed throughout this application can be determined according to the test methods described herein. Samples were (or can be) evaluated using standard ASTM test methods with any special conditions noted below.

TABLE 1

Test Methods

| PROPERTY | COMMENTS |
|---|---|
| Color, b* (ASTM E1348) | Using 3.2 mm thick plaques. Measured using Hunter Lab Ultrascan Spectra Colorimeter |
| Color, a* (ASTM E1348) | Using 3.2 mm thick plaques. Measured using Hunter Lab Ultrascan Spectra Colorimeter |
| Color, L* (ASTM E1348) | Using 3.2 mm thick plaques. Measured using Hunter Lab Ultrascan Spectra Colorimeter |
| Haze (ASTM D1003) | Using 3.2 mm plaques |
| Transmission (ASTM D1003) | Using 3.2 mm plaques |
| Izod Notched Impact at 23° C. (ASTM D256) | Using a 0.32 mm thick bar that has been subjected to 50% relative humidity at 23° C. for 48 hours. |
| Tg (ASTM D3418) | DSC at 20° C./min. |
| Tensile Modulus (ASTM D638) | Using a 165 mm × 13 mm × 3.2 mm bar subjected to 50% Relative humidity for 40 hours at 23° C. |
| Tensile Stress @ Yield (ASTM D638) | Using a 165 mm × 13 mm × 3.2 mm bar subjected to 50% Relative humidity for 40 hours at 23° C. |

The inherent viscosity of the polyesters was determined in 60/40 (wt/wt) phenol/tetrachloroethane at a concentration of 0.5 g/100 ml at 25° C. (according to ASTM D4603).

The glycol content was determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume). Peak assignments for 2,2,4,4-tetramethyl-1,3-cyclobutanediol resonances were made by comparison to model mono- and dibenzoate esters of 2,2,4,4-tetramethyl-1,3-cyclobutanediol. These model compounds closely approximate the resonance positions found in the polymers.

The crystallization half-time, $t_{1/2}$, was determined by measuring the light transmission of a sample via a laser and photo detector as a function of time on a temperature controlled hot stage. This measurement was done by exposing the polymers to a temperature, $T_{max}$, and then cooling it to the desired temperature. The sample was then held at the desired temperature by a hot stage while transmission measurements were made as a function of time. Initially, the sample was visually clear with high light transmission and became opaque as the sample crystallized. The crystallization half-time was recorded as the time at which the light transmission was halfway between the initial transmission and the final transmission. $T_{max}$ is defined as the temperature required to melt the crystalline domains of the sample (if crystalline domains are present). The $T_{max}$ reported in the examples below represents the temperature at which each sample was heated to condition the sample prior to crystallization half time measurement. The $T_{max}$ temperature is dependent on composition and is typically different for each polyester. For example, PCT may need to be heated to some temperature greater than 290° C. to melt the crystalline domains.

Differential scanning calorimetry (DSC) was performed using TA Instruments Model 2920 with a liquid nitrogen cooling accessory. The sample weight, in the range of 8 to 12 mg, was measured and recorded. Samples were first heated ($1^{st}$ heating scan) from 0 to 320° C. at 20° C./min, followed by cooling to 0° C. at 20° C./min (cooling scan), and then heated again from 0 to 320° C. at 20° C. min. Various thermal parameters were measured and recorded. □$H_{cc}$ (cal/g) is the heat of crystallization measured from the cooling scan. $T_{cc}$ is the crystallization peak temperature on the cooling scan. $T_g$ is the glass transition temperature measured from $2^{nd}$ heating scan. $T_m$ is the melting point measured during the $2^{nd}$ heating scan. □$H_{ch1}$ (cal/g) is the heat of crystallization measured during the $1^{st}$ heating scan. □$H_{m1}$ (cal/g) is the heat of melting measured during the $1^{st}$ heating scan.

The percent crystallinity formed during cooling is calculated by equation (1), assuming a specific heat of fusion of 29 cal/g (based on unmodified PCT).

$$X_c = \frac{(\Delta H_{cc})}{29} \times 100 \quad (1)$$

The peak temperature in the crystallization exotherm ($T_{cc}$) occurs at 227° C. for unmodified PCT.

The percentage of strain induced crystallinity (Qc) was determined by equation (2) from the first heating scan of films evaluated in a DSC.

$$X_c = \frac{(\Delta H_{m1} - \Delta H_{CH1})}{29} \times 100 \quad (2)$$

As used herein, the abbreviation "wt" means "weight".

The following examples further illustrate how the compositions of matter of the invention can be made and evaluated, and are intended to be purely exemplary of the invention and are not intended to limit the scope thereof. Unless indicated otherwise, parts are parts by weight, temperature is in degrees C. or is at room temperature, and pressure is at or near atmospheric.

EXAMPLES

Example 1

Melt blend copolyester compositions were prepared from the following starting materials:

1) PCTA 13319 (from Eastman Chemical Company)
2) Copolyester TX1000 (from Eastman Chemical Company)
3) Blue Toner Concentrate The starting materials were melt-blended on a single screw extruder set at 285° C. after drying the PCTA 13319 at 120° C. and TX1000 at 90° C. for 6-8 hrs. in a desiccant bed drying system. The three components were added to the extruder from weight loss feeders at the following concentrations: 49.26 wt % PCTA, 49.44 wt % TX1000 and 1.30 wt % Toner. The resulting (extruded) strand was quenched and cut into cylindrical pellets with a weight average of 0.80 gms/50 pellets. The pellets were amorphous and had an inherent viscosity (IV) of 0.79 to 0.82 (Ex 1-A).

The composition of the Ex 1-A base copolyester had diacid residues of about 97.8 mole % TPA and 2.2 mole % IPA, and glycol residues of about 98.8 mole % CHDM and 11.2 mole % of TMCD. Ex 1-A had a Tg of about 102° C., a Tm of 253 to 259° C. and a crystallization half time of about 1 minute at 175° C.

Some of the Ex 1-A amorphous pellets were crystallized at 180° C. in a rotating reactor for about 120-180 minutes before increasing the temperature to 225° C. for a time sufficient to solid state the copolyester to advance the IV to approximately 0.92 dL/g (Ex 1-B).

Example 2

Test Bar Production

Pellets of each copolyester material from Example 1 (EX 1-A and EX 1-B) were injection molded to form standard test bars 0.5 inch×5 inch×0.125 inch (1.27 cm×12.7 cm×0.3 cm). The pellets were molded in A 110 Ton Toyo injection molding machine with barrel capacity 3.4 oz. The copolyester material was injection molded at 1 in/sec injection speed into four test bars per shot with barrel temperature nominally of about 249° C. (480° F.) and mold temperature of about 80° C.

Test Results

ESCR—Property Retention in Reverse Side Impact

Testing was conducted using injection molded flex bars with length, width, and thickness of 5.0", 0.5", and 0.125", respectively. Bars were conditioned at 23° C./50% RH for a minimum of 72 hr. Bars were clamped into a constant strain fixture or a 3-point bend fixture at 1.5% strain and exposed to test oil using a cotton pad saturated with the test oil, where the pad was placed on the top surface of the bar. After the test oils were applied to the bars on the side without ejector pin marks, the strain fixtures with bars attached were sealed in polyethylene bags for 24 hours at nominal temperature of 23° C., after which the bars were wiped clean and removed from the strain fixture.

After exposure, the bars were tested at 23° C. for reverse-side impact. The test apparatus was a CEAST Pendulum Impact Tester equipped with a 15-Joule hammer. Bars were positioned in a 2-inch span fixture, with the non-chemically exposed side facing the hammer. Control bars (exposed to water) were impact tested in addition to bars that were exposed to the test oils. The comparison of results between the controls and the chemically exposed bars was used to calculate percent retention of original impact energy. The test was repeated five times and the results are an average of the five tests. The results are shown below in Table 2.

TABLE 2

Percent Retention of Reverse-side Impact Strength After Exposure

| Oil | Copolyester EX 1-A | Copolyester EX 1-B |
|---|---|---|
| d- Limonene | 99.5 | 96.8 |
| Geraniol | 99.5 | 98.0 |
| b-Pinene | 86.1 | 82.6 |
| Myrcene | 98.3 | 95.0 |
| Terpinolene | 99.7 | 95.3 |

A review of Table 2 reveals that both materials had good resistance to all the oils tested, with the EX 1-A material outperforming the EX 1-B material.

Comparative Example 1

Similar tests to Example 2 were conducted on test bars made from the following materials: Copolyesters TX1001, GMX201 and DX4001 (from Eastman Chemical Company); Cellulose-based engineering bioplastics GC6011 and GC6021 (from Eastman Chemical Company); and polycarbonate product (MAKROLON polycarbonate PC2608 from Covestro). The results are shown below in Table 3.

TABLE 3

Percent Retention of Reverse-side Impact Strength After Exposure

| Oil | Copolyester TX1001 | Copolyester GMX201 | Copolyester DX4001 | Cellulose GC6011 | Cellulose GC6021 | Polycarbonate PC2608 |
|---|---|---|---|---|---|---|
| d-Limonene | 12 | 8 | 2 | 89 | 89 | 16 |
| Geraniol | 30 | 9 | 8 | 80 | 88 | 8 |
| b-Pinene | 72 | 76 | 0 | 91 | 93 | 34 |
| Myrcene | 15 | 16 | 5 | 87 | 89 | 24 |
| Terpinolene | 10 | 7 | 2 | 91 | 91 | 12 |

A review of Table 3 reveals that the cellulose-based materials outperformed the other materials for the oils tested. However, comparing Table 3 and Table 2, both the EX 1-A and EX 1-B materials outperformed the materials in Table 3, except for b-Pinene where the cellulose-based polymers outperformed.

Example 3 with Comparative Examples

Similar tests to Example 2 were conducted on test bars made from the following materials: Copolyester EX1-A; Copolyesters TX1001, TX1501, TX2001 (from Eastman Chemical Company); Cellulose-based engineering bioplastic GC6021 (from Eastman Chemical Company); polycarbonate product (MAKROLON polycarbonate PC2608 from Covestro); polypropylene product (polypropylene homopolymer PAG3Z-039 from Flint Hills Resources); and ABS plastic product (Terluran GP-35 from Ineos). The test solutions used were as follows (in % by weight): Solution A (50% Limonene/50% Resorcinol); Solution B (80% MCT Oil/20% Limonene); Solution C (95% MCT Oil/5% Limonene); and Solution D (99% MCT Oil/1% Limonene). MCT Oil is medium chain triglyceride oil (MCT Oil from Now Sports). The results are shown below in Table 4.

TABLE 4

Percent Retention of Reverse-side Impact Strength After Exposure

| Test Material | Percent Retention for Test Solution: Solution A | Solution B | Solution C | Solution D |
|---|---|---|---|---|
| TX1001 | 14.2* | 50.3* | 47.2* | 48.0* |
| TX1501 | ** | 24.3* | 29.7* | 34.2* |
| TX2001 | ** | 10.5* | 18.5* | 15.5* |
| EX 1-A | 77.4 | 78.2 | 78.0 | 85.3 |
| GC6021 | 92.5 | 29.3* | 31.0* | 58.8* |
| PC2608 | 10.9* | ** | ** | ** |
| PP | 93.2 | 88.5 | 83.6 | 87.4 |
| ABS | 56.3* | ** | ** | ** |

*A majority of the (5 sample) test bars had breakage during the test.

** Due to significant breakage of bars in the jig, data was not reported.

A review of Table 4 reveals that the cellulose-based, PP and Ex 1-A materials outperformed the other materials for the Limonene/Resorcinol solution tested; and that the PP and Ex 1-A materials outperformed the other materials for the Limonene/MCT Oil solutions tested.

Other embodiments will be apparent to those skilled in the art from consideration of the specification and practice of the embodiments disclosed herein. It will be understood that variations and modifications can be affected within the spirit and scope of the disclosed embodiments. It is further intended that the specification and examples be considered as exemplary only, with a true scope and spirit of the disclosed embodiments being indicated by the following claims.

That which is claimed is:

1. An article comprising a molded component configured to receive a terpene containing oil composition, said molded component formed of a copolyester composition comprising at least one copolyester that comprises:

(a) a dicarboxylic acid component comprising:

i) 97.1 to 98.5 mole % of terephthalic acid residues;

ii) 1.5 to 2.9 mole % of isophthalic acid residues;

(b) a glycol component comprising:

i) 10 to 12 mole % of 2,2,4,4-tetramethyl-1,3-cyclobutanediol residues; and ii) 88 to 90 mole % of 1,4-cyclohexanedimethanol residues, wherein the total mole % of the dicarboxylic acid component is 100 mole %, and the total mole % of the glycol component is 100 mole %; and wherein the inherent viscosity is 0.75 to 0.95 dL/g as determined in 60/40 (wt/wt) phenol/tetrachloroethane at a concentration of 0.5 g/100 ml at 25° C.; and wherein the polyester has a Tg of 100° C. to 115° C.; and said article comprising a terpene containing oil composition in contact with a surface of said molded component, wherein the terpene containing oil composition is in the form of a pre-vapor formulation and/or a vapor, wherein said article comprises molded components formed of the copolyester composition that comprise a container configured to contain a terpene containing oil composition and a conduit configured to convey a terpene containing oil composition, wherein the container and conduit are in fluid communication and are both formed of the copolyester composition.

2. The article according to claim 1, wherein the copolyester composition has a crystallization half time from 30 seconds to 5 minutes.

3. The article according to claim 1, comprising a terpene containing oil composition in contact with a surface of said molded component, wherein the terpene containing oil composition is in the form of a vapor.

4. The article according to claim 1, wherein the terpene containing oil composition comprises at least 1 wt % of a terpene containing oil.

5. The article according to claim 1, wherein the molded component comprises a container configured to contain a terpene containing oil composition and selectively release the terpene containing oil composition.

6. The article according to claim 5, wherein the molded component comprises a container configured to contain a terpene containing oil composition that is in a pre-vapor formulation form.

7. The article according to claim 1, wherein ethylene glycol is excluded from the glycol component.

8. The article according to claim 1, wherein the molded component comprises a conduit configured to convey a terpene containing oil composition that is in a vapor form.

9. The article according to claim 1, wherein the article is a vapor delivery device configured to deliver a vapor comprising a terpene containing oil composition.

10. The article according to claim 9, wherein the vapor delivery device is chosen from a vaporizer, nebulizer, humidifier, air freshener, or hand-held vapor delivery device.

11. The article according to claim 1, wherein the molded component can be chosen from injection molded articles, extrusion molded articles, rotational molded articles, compression molded articles, blow molded articles, injection blow molded articles, injection stretch blow molded articles, extrusion blow molded articles, sheet or film extrusion articles, profile extrusion articles, gas assist molding articles, structural foam molded articles, or thermoformed articles.

12. The article according to claim 1, wherein the plastic composition has a reverse-side impact strength retention of at least 80% after exposure to a terpene oil, when tested according to the methods disclosed in Example 2.

13. The article according to claim 12, wherein the plastic composition has a reverse-side impact strength retention of at least 95% after exposure to d-limonene, when tested according to the methods disclosed in Example 2.

14. The article according to claim 1, wherein the dicarboxylic acid component of the polyester comprises monomer residues having at least 50 mole % recycle content.

* * * * *